(12) United States Patent
Eggert et al.

(10) Patent No.: US 12,055,397 B2
(45) Date of Patent: Aug. 6, 2024

(54) ADVANCED DRIVER ASSISTANCE SYSTEM FOR ASSISTING A DRIVER OF A VEHICLE

(71) Applicant: Honda Research Institute Europe GmbH, Offenbach/Main (DE)

(72) Inventors: Julian Eggert, Offenbach/Main (DE); Tim Puphal, Offenbach/Main (DE); Benedict Flade, Offenbach/Main (DE); Chao Wang, Offenbach/Main (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 261 days.

(21) Appl. No.: 17/709,420

(22) Filed: Mar. 31, 2022

(65) Prior Publication Data
US 2022/0316897 A1   Oct. 6, 2022

(30) Foreign Application Priority Data
Mar. 31, 2021 (EP) .................................... 21166216

(51) Int. Cl.
*G01C 21/00* (2006.01)
*G01C 21/34* (2006.01)
(Continued)

(52) U.S. Cl.
CPC ..... *G01C 21/3461* (2013.01); *G01C 21/3626* (2013.01); *G06V 20/582* (2022.01);
(Continued)

(58) Field of Classification Search
CPC ............ G01C 21/3461; G01C 21/3626; G06V 20/582; G06V 20/584; G06V 20/588;
(Continued)

(56) References Cited

U.S. PATENT DOCUMENTS

| 7,136,754 B2* | 11/2006 | Hahn | ........................ B60R 1/26 701/301 |
| 9,605,971 B2* | 3/2017 | Niehsen | ................. B60K 35/00 |

(Continued)

OTHER PUBLICATIONS

Heise, "BMW: Android Auto from summer 2020," published on Nov. 2019, Available at: https://www.heise.de/autos/artikel/BMW-Android-Auto-ab-Sommer-2020-4612964.html.
(Continued)

*Primary Examiner* — Phutthiwat Wongwian
*Assistant Examiner* — Sherman D Manley
(74) *Attorney, Agent, or Firm* — JCIPRNET

(57) ABSTRACT

The present invention provides an advanced driver assistance system for assisting a driver of a vehicle. The system comprises a sensor unit, a processing unit and a display unit. The sensor unit is configured to sense an environment of the vehicle. The processing unit is configured to determine, based on a sensing output, at least one feature of the environment. The processing unit is configured to determine, for a current time, a risk zone of the feature, by estimating, based on at least one parameter of the vehicle at the current time, at each virtual position of two or more virtual positions of the vehicle a respective risk with regard to the feature; and by forming the risk zone based on the two or more risks. The display unit is configured to display the environment of the vehicle with the feature and the risk zone of the feature.

18 Claims, 12 Drawing Sheets

(51) Int. Cl.
  G01C 21/36 (2006.01)
  G06V 20/56 (2022.01)
  G06V 20/58 (2022.01)
  G07C 5/04 (2006.01)
(52) U.S. Cl.
  CPC .......... G06V 20/584 (2022.01); G06V 20/588 (2022.01); G07C 5/04 (2013.01)
(58) Field of Classification Search
  CPC .......... G06V 20/56; G06V 20/54; G07C 5/04; B60W 30/0953; B60W 30/0956; B60W 40/02; B60W 40/10; B60W 50/0097; B60W 50/0098; B60W 50/14; B60W 2050/0043; B60W 2050/146; B60W 2552/50; B60W 2552/53; B60W 2555/60
  See application file for complete search history.

(56) References Cited

U.S. PATENT DOCUMENTS

| | | | | |
|---|---|---|---|---|
| 11,807,260 | B2* | 11/2023 | Seitz | B60K 35/00 |
| 2008/0055114 | A1* | 3/2008 | Kim | G06V 20/56 701/1 |
| 2016/0176399 | A1* | 6/2016 | Takagi | B60W 30/18154 701/301 |
| 2016/0207530 | A1* | 7/2016 | Stanek | B60W 10/20 |
| 2016/0236683 | A1* | 8/2016 | Eggert | G01S 13/86 |
| 2016/0264045 | A1* | 9/2016 | Ng-Thow-Hing | B60Q 9/00 |
| 2017/0116485 | A1* | 4/2017 | Mullen | G08G 1/09626 |
| 2017/0225567 | A1* | 8/2017 | Tsuda | B60Q 1/507 |
| 2018/0128635 | A1* | 5/2018 | Nakamura | B60W 30/18163 |
| 2018/0231974 | A1* | 8/2018 | Eggert | B60W 30/085 |
| 2020/0004268 | A1* | 1/2020 | Park | G01C 21/3658 |
| 2020/0302657 | A1* | 9/2020 | Shimazu | H04N 23/00 |
| 2020/0369149 | A1* | 11/2020 | Kassner | G08G 1/165 |
| 2021/0323540 | A1* | 10/2021 | De Weser | G06V 20/56 |
| 2022/0315027 | A1* | 10/2022 | Behring | B60K 35/00 |

OTHER PUBLICATIONS

Masahiko Itoh et al., "Visual interface for exploring caution spots from vehicle recorder big data," 2015 IEEE International Conference on Big Data (Big Data), Dec. 2015, pp. 1-9.

Frank Försterling, "Electronic Horizon—How the Cloud improves the connected vehicle," Continental AG, May 2015, pp. 1-21.

Christian Ress et al., "Electronic Horizon—Providing Digital Map Data for ADAS Applications," In Proceedings of the 2nd International Workshop on Intelligent Vehicle Control Systems, 2008, pp. 40-49.

Bosch, "Connected Horizon," accessed on Mar. 2022, Available at: http://www.bosch-softtec.com/connected_horizon.html.

Ashesh Jain et al., "Car that Knows Before You Do: Anticipating Maneuvers via Learning Temporal Driving Models," 2015 IEEE International Conference on Computer Vision (ICCV), Apr. 2015, pp. 3182-3190.

Nexyad, "SafetyNex—Real Time Onboard Driving Risk Assessment for Car Telematics," accessed on Mar. 2022, Available at: https://www.safetynex.nexyad.net.

Robert Hof, "Toyota: 'Guardian Angel' Cars Will Beat Self-Driving Cars," published on Apr. 2016, Available at: https://www.forbes.com/sites/roberthof/2016/04/08/toyota-guardian-angel-cars-will-beat-self-driving-cars/#7a2f8caa7f7f.

Here Platform, "Here HD Live Map," accessed on Mar. 2022, Available at: https://www.here.com/products/automotive/electronic-horizon.

Youtube, "MBUX Augmented Reality for Navigation in Mercedes-Benz A-Class 2018 :: [1001cars]," published on Apr. 2018, Available at: https://www.youtube.com/watch?v=44myNm8T1Vw.

* cited by examiner

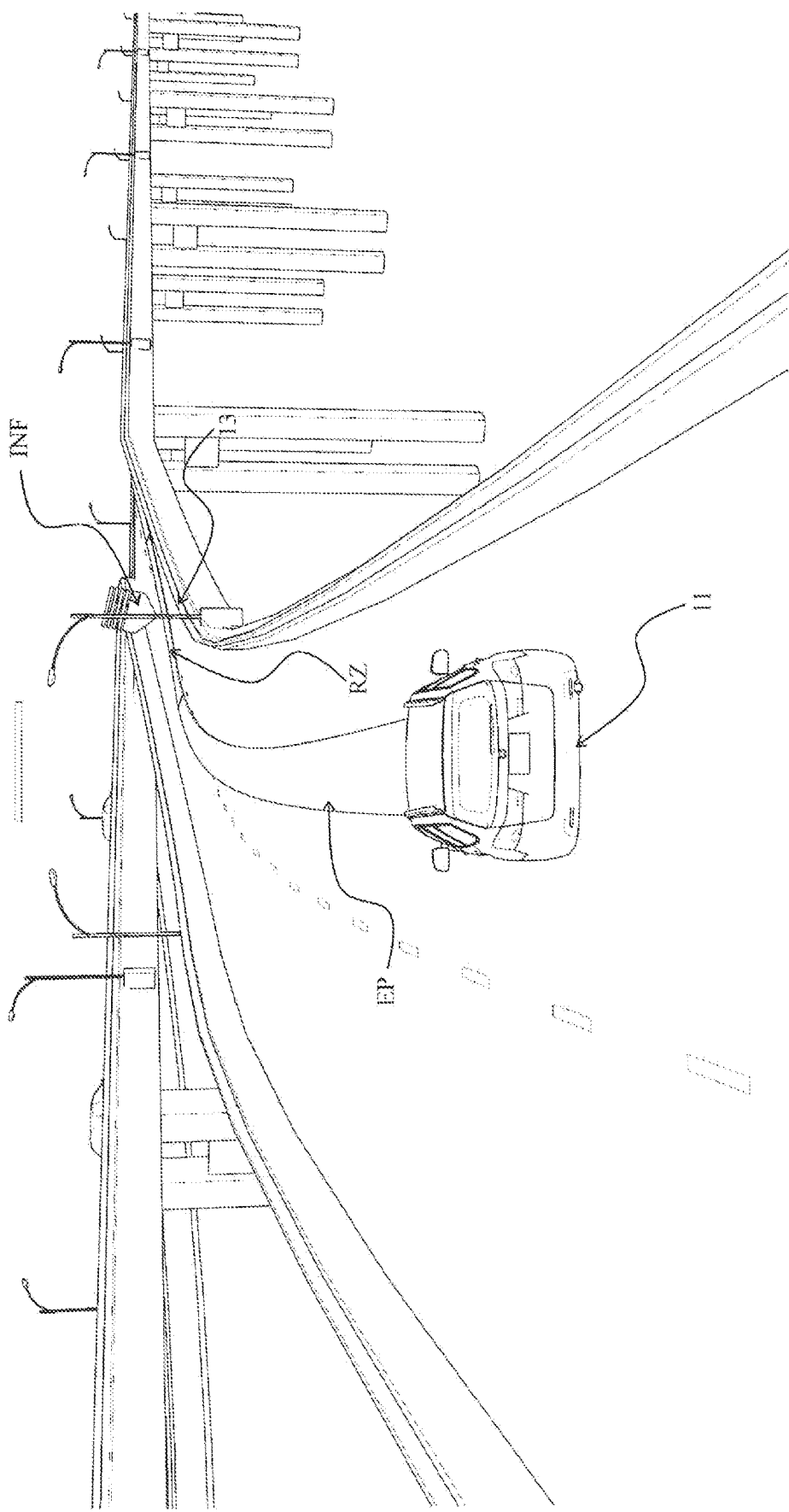

ADVANCED DRIVER ASSISTANCE SYSTEM FOR ASSISTING A DRIVER OF A VEHICLE

CROSS-REFERENCE TO RELATED APPLICATION

This application claims the priority benefit of European application serial no. 21166216.8, filed on Mar. 31, 2021. The entirety of the above-mentioned patent application is hereby incorporated by reference herein and made a part of this specification.

BACKGROUND

Technical Field

The present invention relates to an advanced driver assistance system for assisting a driver of a vehicle, to a vehicle comprising such an advanced driver assistance system and to a method for assisting a driver of a vehicle.

Description of Related Art

The present invention is in the field of advanced driver assistance systems for assisting a driver of a vehicle. Such an advanced driver assistance system may assist the driver of the vehicle when driving (respectively using) the vehicle by informing the driver on risks that are present in the environment of the vehicle. For example, the advanced driver assistance system may comprise a display on which the location of obstacles, such as a person, in the environment of the vehicle is highlighted so that the driver is informed on the presence of the obstacles and, thus, may adapt the driving of the vehicle to the obstacles. For example, the driver may adapt the driving of the vehicle to the obstacles by reducing the speed of the vehicle and/or changing the driving direction of the vehicle in order to not collide with an obstacle.

The advanced driver assistance system may estimate risks for a current time. For this, the advanced driver assistance system typically comprises sensors for detecting the environment of the vehicle at a position of the vehicle at a current time. This allows the advanced driver assistance system to assess the environment of the vehicle and, thus, to compute estimated risks of the environment for the position of the vehicle at the current time. For example, such an estimated risk may be an estimated risk of collision with obstacles of the environment for the position of the vehicle at the current time. Methods for estimating risks (i.e. computing estimated risks) of the environment for the position of the vehicle at the current time, based on sensing results of the environment at the position of the vehicle at the current time, are well known in the art and they are not the focus of the present invention.

The above described advanced driver assistance systems have the disadvantage that they do not consider the psychology of a person, in particular they do not consider how a person perceives risks with regard to the own person in real life. As a result, the information on estimated risks provided by an advanced driver assistance systems may not be intuitively understood by the driver, which increases the reaction time of the driver for reacting respectively counteracting to the risks.

Therefore, the present invention provides an improved advanced driver assistance system that overcomes the above described disadvantages. The present invention provides an improved advanced driver assistance system for assisting a driver of a vehicle that allows improving the estimation of risks, which are present in the environment, at a current time for the future driving of the vehicle. the present invention provides an advanced driver assistance system that is improved with regard to assisting the driver of the vehicle, in particular by being adapted to the psychology of a person, in particular to how a person perceives risks with regard to the own person in real life.

SUMMARY

According to a first aspect of the present invention, an advanced driver assistance system for assisting a driver of a vehicle is provided. The system comprises a sensor unit, a processing unit and a display unit. The sensor unit is configured to sense an environment of the vehicle and provide a sensing output to the processing unit. The processing unit is configured to determine, based on the sensing output, at least one feature of the environment. The processing unit is configured to determine, for a current time, a risk zone of the feature, by:
estimating, based on at least one parameter of the vehicle at the current time, at each virtual position of two or more virtual positions of the vehicle a respective risk with regard to the feature to estimate for the two or more virtual positions two or more risks; and
forming the risk zone based on the two or more risks.

The display unit is configured to display the environment of the vehicle with the feature and the risk zone of the feature.

According to a second aspect of the present invention, a vehicle is provided, wherein the vehicle comprises an advanced driver assistance system according to the first aspect of the present invention, as described above, for assisting a driver of the vehicle.

According to a third aspect of the present invention a method for assisting a driver of a vehicle is provided. The method comprises: sensing an environment of the vehicle, providing a sensing output and determining, based on the sensing output, at least one feature of the environment. The method further comprises: determining, for a current time, a risk zone of the feature, by estimating, based on at least one parameter of the vehicle at the current time, for each virtual position of two or more virtual positions of the vehicle a respective risk with regard to the feature to estimate for the two or more virtual positions two or more risks, and by forming the risk zone based on the two or more risks. The method further comprises: displaying the environment of the vehicle with the feature and the risk zone of the feature.

BRIEF DESCRIPTION OF THE DRAWINGS

In the following, the invention is described exemplarily with reference to the enclosed figures, in which FIG. 1 exemplarily shows a flow diagram of an embodiment of the method according to the third aspect of the present invention;

FIGS. 7 to 12 show examples of outputs that may be displayed by the display unit of an embodiment of the advanced driver assistance system according to the first aspect of the present invention.

DESCRIPTION OF THE EMBODIMENTS

Figure 1:
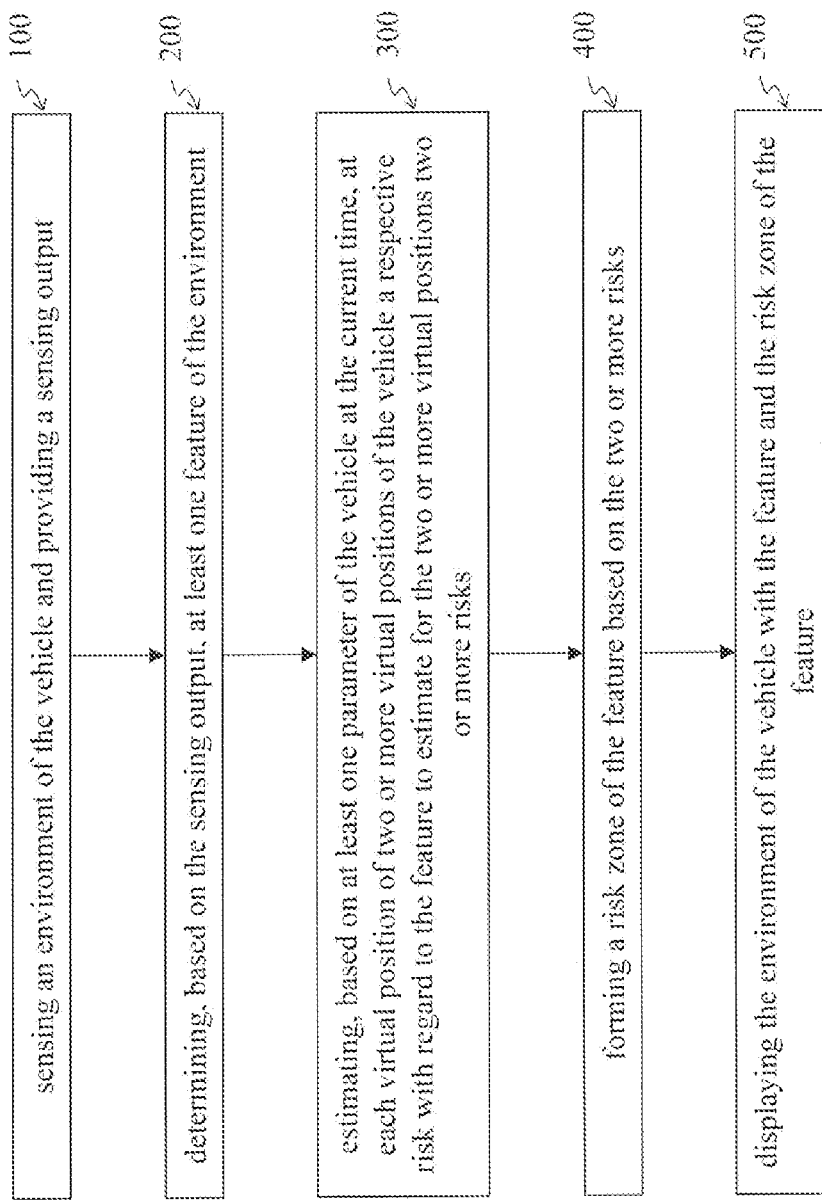

According to the first aspect of the present invention, the processing unit is configured to estimate, for a current time and based on at least one parameter of the vehicle at the current time, a theoretical risk with regard to a detected feature in the environment of the vehicle, assuming that the vehicle is not located at the actual position of the vehicle at the current time, but at a virtual position. A virtual position corresponds to an assumed position of the vehicle different from the actual position, and, thus, is a theoretical position. In particular, the two or more virtual positions comprise or correspond to positions that are different from each other and different from the actual position of the vehicle at the current time. The terms "sense" and "detect" may be used as synonyms.

The risk with regard to the feature estimated for a virtual position of the vehicle is estimated based on the at least one parameter of the vehicle at the current time and not based on the at least one parameter of the vehicle at a time, at which the actual position of the vehicle is equal to the virtual position. That is, for estimating risk with regard to the feature at a current time, based on the at least one parameter of the vehicle at the current time, not the actual position of the vehicle at the current time is used, but a virtual position of the vehicle is used. That virtual position corresponds to a theoretical position of the vehicle at the current time.

Therefore, according to the first aspect of the present invention, at a current time the risk with regard to the at least one feature may be estimated for a virtual position of the vehicle. That is, it is assumed that at the current time the vehicle is not at the actual position but at a virtual position for estimating at the current time the risk with regard to the at least one feature. Although, not the actual position but the virtual position (that is assumed) is used for estimating, at the current time, the risk with regard to the at least one feature, the estimation of the risk is based on a value of the at least one parameter of the vehicle that is present at the current time. The value of the at least one parameter of the vehicle that would be present at a time when the vehicle is actually at the virtual position (i.e. when the actual position of the vehicle is equal to the assumed virtual position of the vehicle) is not used according to the first aspect of the present invention for the estimation of the risk at the current time. Therefore, the advanced driver assistance system of the first aspect differs from another system that estimates at a current time, for a virtual position of the vehicle, the risk with regard to at least one feature (of the environment of the vehicle) based on a value of at least one parameter of the vehicle that would be present at a time when the vehicle is actually at the virtual position.

In other words, the advanced driver assistance system of the first aspect allows estimating the risk with regard to the at least one feature for the theoretical case that the vehicle is present at a virtual position at the current time. Therefore, the at least one parameter of the vehicle at the current time is used for estimating the risk for that theoretical case. The aforementioned other system in contrast is merely configured to estimate the risk with regard to the at least one feature for a future time, namely a time when the vehicle will be actually present at the virtual position. Thus, the other system uses the at least one parameter of the vehicle at that future time for estimating, for the future time, the risk.

Therefore, an estimated risk with regard to the feature, estimated based on the at least one parameter of the vehicle at the current time and for a virtual position of the vehicle, corresponds to the actual risk with regard to the feature that would have been estimated based on the at least one parameter of the vehicle at the current time, if the actual position of the vehicle was equal to the virtual position at the current time. Thus, the respective risk is a theoretical risk respectively the two or more risks are theoretical risks.

By forming the risk zone based on the two or more estimated risks and displaying the environment of the vehicle with the feature and the risk zone of the feature, a risk space respectively a risk area is visualized with regard to the feature. This risk zone may represent a dangerous area, in which the vehicle should not be at the current time. The terms "zone", "space" and "area" may be used as synonyms. The risk zone of the feature may represent a personal (i.e. peripersonal) space of the feature. This allows the driver to intuitively recognize from the display unit a risk situation of the vehicle at the current time, based on the displayed environment of the vehicle, the displayed feature and the displayed risk zone of the feature, because every person has its own personal space that the person does not want to be invaded. Therefore, by indicating the personal space of the feature in the form of the risk zone to the driver, the driver may not only receive the information on the two or more estimated risks with regard to the feature from the display of the risk zone of the feature. The driver will also be aware of a personal space of the feature, which the person intuitively will put attention to due to the person's psychology. That is, the risk zone of the feature informs the driver on an area that the vehicle should not invade.

The display unit of the system according to the first aspect is different to another system, in which risks with regard to at least one feature of the environment of the vehicle are displayed only for future times. Namely, according to the first aspect, the display unit is configured to display the risk zone of the at least one feature, wherein the risk zone is formed based on two or more risks that each are estimated, based on the at least one parameter of the vehicle at the current time, for a respective virtual position. In other words, according to the first aspect, the display unit may be configured to display estimated risks for two or more virtual positions for the current time.

Furthermore, displaying the feature in association with the risk zone of the feature in the context of the environment, allows the driver to better plan a future driving. At the current time, the driver may perceive, based on the displayed risk zone of the feature, estimated risks with regard to the feature at the current time at positions (virtual positions) that are different from the actual position of the vehicle at the current time. This allows the driver intuitively assessing the risk situation of the vehicle in the environment of the vehicle at the current time.

In addition, displaying the risk zone of the feature and the feature allows displaying the risks of the risk zone together with the source of or reason for the risks, so that the driver may intuitively understand the reason for taking care with respect to the risks of the risk zone.

In particular, the sensor unit is configured to sense for the current time the environment of the vehicle, and the display unit is configured to display for the current time the environment of the vehicle with the feature and the risk zone of the feature. The sensor unit, processing unit and display unit each may be configured to perform its respective function in real-time. That is, the sensor unit may be configured to continuously sense respectively monitor the environment of the vehicle and provide the sensing output to the processing unit. The processing unit may be configured to continuously determine, based on the sensing output, at least one feature of the environment and to determine, for a current time, a risk zone of the at least one feature. The display unit may be configured to continuously display the environment of the vehicle with the at least one feature and the risk zone of the at least one feature.

Optionally, the processing unit is configured to estimate, based on the at least one parameter of the vehicle at the current time, at the actual position of the vehicle at the current time an actual risk with regard to the feature. The display unit may be configured to display the estimated actual risk with regard to the feature in addition to the at least one feature and the risk zone of the at least one feature.

The two or more virtual positions may be spatially closer to the feature compared to the actual position of the vehicle at the current time. At least a part of the virtual positions may be at different distances from the feature.

The processing unit is configured to form the risk zone based on the respective risk, estimated for each virtual position of the two or more virtual positions.

The vehicle may also be referred to as ego-vehicle, because the driver of the vehicle may be assisted by the advanced driver assistance system. The vehicle may be any vehicle known in the art that may be driven by a driver on ground, near ground or in water, such as a car, a motorbike, a truck, a bicycle (e.g. electric bicycle), a plane, a helicopter, a boat, a submarine etc. Optionally, a vehicle is at least a ground vehicle (movable on ground). The vehicle may optionally be also a water vehicle (movable in and optionally under water) and/or air vehicle (movable in the air, i.e. able to fly). The vehicle may be equipped with a motor, such as a combustion motor, an electric motor, a hybrid motor. In case the vehicle is an air vehicle, such as a plane or vehicle, the following description with respect to a street may be relevant, when the air vehicle is moved on ground or near ground (e.g. helicopter flying near ground). In case the vehicle is a water vehicle, such as a boat, the following description with respect to a street may be relevant with respect to water paths, such as water ways, water channels etc.

The sensor unit may comprise or correspond to one or more sensors for sensing the environment of the vehicle. For example, the sensor unit may comprise or correspond to at least one camera, at least one radar sensor, at least one Lidar sensor, at least one ultrasonic sensor, at least one infrared sensor and/or at least one presence and/or movement sensor. Additionally or alternatively, the sensor unit may comprise or correspond to any other one or more sensors known in the art for sensing respectively monitoring an environment.

The advanced driver assistance system may comprise a localization unit configured to determine the actual location of the vehicle at the current time. The localization unit may be part of the processing unit. The localization unit may be part of an optional navigation system. The localization unit may comprise or correspond to at least one gyroscope and/or at least one accelerometer. Additionally or alternatively, the localization unit may be configured to determine the actual position of the vehicle using the global navigation satellite system (GNSS), e.g., Global Positioning System (GPS), and/or radio communication, such as a mobile communication system (e.g. a cellular network). The localization unit may be implemented by any means known in the art.

The advanced driver assistance system may comprise a navigation system configured to provide navigation assistance to the driver of the vehicle. The navigation system may be part of the processing unit. The navigation system may be implemented by any means known in the art. The display unit may be configured to display a recommended driving path recommended by the navigation system. The advanced driver assistance system may comprise a map unit configured to provide map data for the environment of the vehicle, in particular for the actual position of the vehicle at the current time. The map unit may be part of the processing unit. The map unit may be configured to store the map data in a data storage of the advanced driver assistance system, in particular in the form of one or more look-up tables, and/or may be configured to receive the map data from extern, e.g. from an external data base. The data storage may comprise or correspond to a removable data storage, such as a USB flash driver (USB stick), an external hard disk driver or an optical disc (e.g. Blu-ray disc, DVD, CD). The map unit may be configured to wirelessly receive the map data from extern.

The processing unit may comprise or correspond to a controller, a microcontroller, a processor, a microprocessor, an application specific integrated circuit (ASIC), a field-programmable gate-array (FPGA) or any combination thereof. The processing unit may comprise a risk framework for computing estimated risks, in particular the two or more estimated risks for the two or more virtual positions of the vehicle. The risk framework may correspond to software that is executable by the processing unit. The processing unit may comprise a risk engine configured to compute an estimated risk for a respective virtual position of the vehicle. The processing unit may comprise a risk mapper which is configured to perform the risk estimation with regard to paths. The path may comprise or correspond to a path between the vehicle and the feature; an estimated driving path of the vehicle at the current time and/or an estimated movement path of the feature, in case the feature is a movable obstacle. The processing unit may comprise a situation classifier configured to predict an intention of acting of the driver, in particular predict an intended driving behavior of the driver. The risk engine, risk mapper and situation classifier may form a full risk framework. The risk engine, risk mapper and situation classifier may correspond to software that is executable by the processing unit. The risk framework, in particular the risk engine, risk mapper and situation classifier, may be implemented by any means known in the art. That is, the processing unit may be configured to estimate a risk based on the at least one parameter of the vehicle and any position of the vehicle provided as input data to the processing unit according to any means known in the art. According to the first aspect of the present invention, two or more virtual positions of the vehicle are input as the position of the vehicle at the current time to the processing unit.

The display unit may comprise or correspond to one or more displays (also referred to as screens). Additionally or alternatively, the display unit may comprise or correspond to a head-up display (i.e. a transparent display) for displaying information. The information may comprise or correspond to the environment of the vehicle, the feature, the risk zone of the feature and/or additional information on the feature and/or other characteristics of the environment. The display unit may be configured to display a navigation based on map data. The display unit may be configured to display the environment based on map data. The display unit may be configured to display information on the state of the vehicle, in particular on the at least one parameter of the vehicle. The display unit may be configured to display information instructing the driver on a driving behavior (e.g. instruction to reduce speed, to brake etc.) dependent on the actual position of the vehicle with regard to the risk zone of the at least one feature.

The display unit may be configured to display the at least one feature and the risk zone of the at least one feature in a 2D birds-eye-view of the environment of the vehicle. Additionally or alternatively, the display unit may be configured to display the at least one feature and the risk zone of the at least one feature in a first-person-view perspective included in a virtual reality display of the environment of the vehicle. Additionally or alternatively, the display unit may be configured to display the at least one feature and the risk zone of the at least one feature in a first-person-view perspective using an augmented reality display. Additionally or alternatively, the display unit may be configured to display the at least one feature and the risk zone of the at least one feature such that they are projected onto a 2D plane of a street, on which the vehicle drives, and such that they are constrained by the street geometry (e.g. only visualized on drivable areas).

The advanced driver assistance system may comprise a human machine interface (HMI). The display unit may be part or correspond to the human machine interface. The human machine interface may be configured to output driving behavior recommendations or instructions (e.g. reducing speed, braking etc.) and warnings based on the risks of the risk zone of the at least one feature. In addition or alternatively, the human machine interface may be configured to output driving behavior recommendations or instructions and warnings based on the distance between the actual position of the vehicle at the current time and a border of the risk zone. The human machine interface may be configured to provide visual output, in particular using the display unit, audio output (e.g. using loudspeakers) and/or tactile output (e.g. using vibration elements, such as vibration elements positioned at the steering wheel). The human machine interface may be implemented by any means known in the art. The recommendations and warnings may be communicated to the driver by the human machine interface in order to support the driving behavior of the driver.

In case the processing unit determines two or more features of the environment of the vehicle, the above description and following description with respect to one feature is correspondingly valid for each feature of the two or more features.

Optionally, the processing unit is configured to determine, for the current time, the risk zone of the feature by iteratively performing a risk estimation process for a plurality of virtual positions of the vehicle comprising or corresponding to the two or more virtual positions of the vehicle to estimate for the two or more virtual positions the two or more respective risks. In each iteration of the risk estimation process, for a respective virtual position of the plurality of virtual positions, a respective risk with regard to the feature is estimated based on the at least one parameter of the vehicle at the current time. The risk estimation process is stopped after an iteration, in which the respective risk is equal to or smaller than a risk threshold.

In case the number of the two or more risks estimated in the risk estimation process is smaller than a threshold, the processing unit may be configured to repeat the risk estimation process, wherein
distances, from the feature, of the plurality of virtual positions used in the repeated risk estimation process are decreased compared to the distances, from the feature, of the plurality of virtual positions used in the risk estimation process. Initially, the plurality of virtual positions may be arbitrarily selected within constraints. Such a constraint may be an area around the feature, within which the virtual positions are to be located.

In case the risk estimation process stops after the first iteration, the processing unit may be configured to repeat the risk estimation process, wherein the distances, from the feature, of the plurality of virtual positions used in the repeated risk estimation process are decreased compared to the distances, from the feature, of the plurality of virtual positions used in the risk estimation process.

In case the risk estimation process stops after a first iteration, the processing unit may be configured to repeat the risk estimation process using a different virtual position in a first iteration of a repeated risk estimation process compared to the virtual position used in the first iteration of the risk estimation process.

The processing unit may be configured to iteratively perform the risk estimation process for the plurality of virtual positions of the vehicle in the order of distances of the plurality of virtual positions from the feature, starting with a virtual position of the plurality of virtual positions that is spatial closest to the feature. Optionally, the plurality of virtual positions is spatially closer to the feature compared to an actual position of the vehicle at the current time.

The processing unit may be configured to store a virtual position of the iteration, in which the respective risk is equal to or smaller than the risk threshold, as a critical position defining a start or end of the risk zone of the feature.

Optionally, the processing unit may use all the risks estimated by the risk estimation process, except of the risk estimated in the last iteration of the risk estimation process, after which the risk estimation process is stopped. That is, the two or more risks may correspond to the risks estimated by the risk estimation process, except of the risk estimated in the last iteration of the risk estimation process, after which the risk estimation process is stopped.

In case the processing unit determines two or more features of the environment: the processing unit may be configured to determine, for the current time, the risk zone of at least one feature of the two or more features, and the display unit may be configured to display the environment of the vehicle with the two or more features and the risk zone of the at least one feature of the two or more features. Alternatively, the processing unit may be configured to determine, for the current time, the risk zone of each feature of the two or more features, and the display unit may be configured to display the environment of the vehicle with the two or more features and the risk zone of at least one feature of the two or more features.

The feature may comprise or correspond to at least one of obstacles present in the environment, street characteristics present in the environment, and indicators indicating traffic rules.

For example, such an indicator may indicate, as a traffic rule, to stop at a position, to give way to another vehicle at a position or to limit the driving speed to a speed limit.

The obstacles may comprise further vehicles, persons and further physical objects. The street characteristics may comprise street curves, street intersections, street slopes greater than a slope threshold, street areas influenced by weather and street areas with a damaged surface. The indicators indicating traffic rules may comprise traffic signs, ground markings on a street and traffic lights.

The at least one parameter may comprise or correspond to at least one of a driving direction of the vehicle, a speed of the vehicle, an acceleration of the vehicle, an acceleration time of the vehicle, a braking time of the vehicle, a size of the vehicle, and a shape of the vehicle.

The advanced driver assistance system may comprise one or more sensors that are configured to sense the at least one parameter of the vehicle and provide the at least one parameter of the vehicle to the processing unit. Additionally or alternatively, the processing unit is configured to receive the at least one parameter of the vehicle from extern, e.g. from an external database. The processing unit may be configured to wirelessly receive the at least one parameter of the vehicle from extern.

The respective risk may comprise or correspond to, depending on a type of the feature, a time-based risk. The time-based risk may be one of a time headway, a time-to-collision, a time-to-break, a brake threat number, a time-to-steer and responsibility sensitive safety. In addition or alternatively, the respective risk may comprise or correspond to, depending on a type of the feature, a probabilistic risk. The probabilistic risk may be a risk estimated according to a Gaussian method or a risk estimated according to a survival analysis.

The respective risk may comprise or correspond to, depending on a type of the feature and optionally an estimated driving path of the vehicle at the current time:
  a risk of collision, in case the feature corresponds to an obstacle present in the environment, a street intersection or to an indicator indicating at least one traffic rule (optionally a traffic sign, a ground marking on a street or a traffic light);
  a risk of lane departure, in case the feature is a street curve, a street intersection, a street slope greater than a slope threshold, a street area influenced by weather or a street area with a damaged surface;
  a risk of lateral acceleration, in case the feature is a street curve or a street intersection;
  a risk of acceleration, in case the feature is a street slope greater than a slope threshold;
  a risk of control loss of the vehicle, in case the feature is a street curve, a street intersection, a street slope greater than a slope threshold, a street area influenced by weather or a street area with a damaged surface;
  a risk of violation of traffic rules, in case the feature corresponds to an indicator indicating at least one traffic rule (optionally a traffic sign, a ground marking on a street or a traffic light); and/or
  a risk of damage of the vehicle, in case the feature corresponds to a street area with a damaged surface.

In other words the two or more risks (estimated at the two or more virtual positions of the vehicle) may comprise or correspond to risks of collisions, risks of lane departure, risks of lateral acceleration, risks of acceleration, risks of control loss of the vehicle, risks of violation of traffic rules and/or risks of damage of the vehicle.

Optionally, the virtual positions of the vehicle form a grid.

The processing unit may be configured to arrange the virtual positions in the environment depending on a type of the feature. In addition or alternatively, the processing unit may be configured to arrange the virtual positions in the environment such that the virtual positions are arranged at least in an area between the vehicle and the feature at the current time. In addition or alternatively, the processing unit may be configured to arrange the virtual positions in the environment such that the virtual positions are arranged in an area between the vehicle and the feature at the current time. In addition or alternatively, the processing unit may be configured to arrange the virtual positions in the environment such that at least one of the virtual positions is equal to an actual position of the feature or an actual position of a part of the feature at the current time. In addition or alternatively, the processing unit may be configured to arrange the virtual positions in the environment such that at least one of the virtual positions is equal to a position associated with the actual position of the feature or associated with the actual position of a part of the feature at the current time.

Optionally, the processing unit is configured to arrange the virtual positions in the environment such that the virtual positions are arranged along a path. The path may be a path between the vehicle and the feature at the current time. In addition or alternatively, the path may be an estimated driving path of the vehicle at the current time. In addition or alternatively, the path may be an estimated future movement path of the feature, in case the feature is a movable obstacle. In addition or alternatively, the path may be fitted to a street on which the vehicle and/or the movable obstacle is present, optionally moving, at the current time. In addition or alternatively, the path may be fitted to the feature. The path may be provided by map data.

The estimated driving path may be determined based on the driving behavior of the driver and/or a navigation system on which a navigation is run (the path corresponds to the recommended driving path recommended by the navigation system). The passage "fitted to a street" may be understood as "fitted to a course and/or shape of the street".

The display unit may be configured to display the risk zone of the feature by changing a color, shading and/or pattern of the risk zone depending on a distance between a border of the risk zone and an actual position of the vehicle at the current time. In addition or alternatively, the display unit may be configured to display the risk zone of the feature such that the risk zone is segmented in segments of different color, shading and/or pattern, wherein the segments correspond to consecutive ranges of risk. In addition or alternatively, the display unit may be configured to display the risk zone of the feature such that the risk zone is fitted to the feature and/or a street on which the feature is present at the current time.

In case the feature is a street curve, the processing unit may be configured to estimate, based on the at least one parameter of the vehicle at the current time, at each virtual position of the virtual positions of the vehicle a lateral acceleration caused by a curvature of the street curve as the respective risk. The virtual positions may be equal to actual positions of different parts of the street curve. The respective risk may be a risk of lane departure, wherein the greater the lateral acceleration the greater the risk of lane departure.

In case the feature is an indicator indicating at least one traffic rule (optionally a traffic sign, a ground marking on a street or a traffic light) or a street intersection, the processing unit may be configured to estimate, based on the at least one parameter of the vehicle at the current time, at each virtual position of the virtual positions of the vehicle a risk of collision as the respective risk. The virtual positions may be arranged at least in an area between the vehicle and the feature and at least one of the virtual positions may be equal to an actual position of the feature or an actual position of a part of the feature. This may be the case, when the feature is a ground marking (as an indicator indicating at least one traffic rule) on a street or a street intersection. Alternatively, the virtual positions may be arranged at least in an area between the vehicle and the feature and at least one of the virtual positions is equal to a position associated with the actual position of the feature or associated with the actual position of a part of the feature. This may be the case, when the feature is a traffic sign or a traffic light (as an indicator indicating at least one traffic rule).

The processing unit may be configured to determine, based on the two or more risks and/or the risk zone of the at least one feature, driving behavior recommendations. In addition or alternatively, the processing unit may be configured to determine, based on the two or more risks and/or the risk zone of the at least one feature, driving behavior instructions. In addition or alternatively, the processing unit may be configured to determine, based on the two or more risks and/or the risk zone of the at least one feature, warnings. The display unit may be configured to display the driving behavior recommendations, the driving behavior instructions and/or the warnings. For this, the advanced driver assistance system may comprise a human machine interface (HMI), as outlined already above. The display unit may be part or correspond to the human machine interface. The above description with regard to driving behavior recommendations, driving behavior instructions, warnings and a human machine interface is correspondingly valid.

As outlined already above, the display unit may be configured to display the at least one feature and the risk zone of the at least one feature:
  in a 2D birds-eye-view of the environment of the vehicle;
  in a first-person-view perspective included in a virtual reality display of the environment of the vehicle;
  in a first-person-view perspective using an augmented reality display; and/or such that they are projected onto a 2D plane of a street, on which the vehicle drives, and such that they are constrained by the street geometry.

In order to achieve the advanced driver assistance system according to the first aspect of the present invention, some or all of the above described optional features may be combined with each other.

The above description with regard to the advanced driver assistance system according to the first aspect of the present invention is also valid for the vehicle according to the second aspect of the present invention.

The vehicle according to the second aspect of the present invention achieves the same advantages as the advanced driver assistance system according to the first aspect of the present invention.

The advanced driver assistance system of the vehicle is implemented according to the advanced driver assistance system of the first aspect of the present invention described above.

The above description with regard to the advanced driver assistance system according to the first aspect of the present invention is also valid for the method according to the third aspect of the present invention.

Optionally, the method comprises: determining, for the current time, the risk zone of the feature by iteratively performing a risk estimation process for a plurality of virtual positions of the vehicle comprising or corresponding to the two or more virtual positions of the vehicle to estimate for the two or more virtual positions the two or more risks. In each iteration of the risk estimation process, at a respective virtual position of the plurality of virtual positions a respective risk with regard to the feature is estimated based on the at least one parameter of the vehicle at the current time. The risk estimation process is stopped after an iteration, in which the respective risk is equal to or smaller than a risk threshold.

In case two or more features of the environment are determined, the method may comprise: determining, for the current time, the risk zone of at least one feature of the two or more features; and displaying the environment of the vehicle with the two or more features and the risk zone of the feature of the two or more features. Alternatively, the method may comprise: determining, for the current time, the risk zone of each feature of the two or more features; and displaying the environment of the vehicle with the two or more features and the risk zone of at least one feature of the two or more features.

The method may comprise: arranging the virtual positions in the environment depending on a type of the feature. In addition or alternatively, the method may comprise: arranging the virtual positions in the environment such that the virtual positions are arranged, optionally at least, in an area between the vehicle and the feature at the current time. In addition or alternatively, the method may comprise: arranging the virtual positions in the environment such that at least one of the virtual positions is equal to an actual position of the feature or an actual position of a part of the feature at the current time. In addition or alternatively, the method may comprise: arranging the virtual positions in the environment such that at least one of the virtual positions is equal to a position associated with the actual position of the feature or associated with the actual position of a part of the feature at the current time.

Optionally, the method comprises arranging the virtual positions in the environment such that the virtual positions are arranged along a path. The path may be a path between the vehicle and the feature at the current time. In addition or alternatively, the path may be an estimated driving path of the vehicle at the current time. In addition or alternatively, the path may be an estimated movement path of the feature, in case the feature is a movable obstacle. In addition or alternatively, the path is fitted to a street on which the vehicle and/or the movable obstacle is present, optionally moving, at the current time. In addition or alternatively, the path may be fitted to the feature.

The method may comprise: displaying the risk zone of the feature by changing a color shading and/or pattern of the risk zone depending on a distance between a border of the risk zone and an actual position of the vehicle at the current time. In addition or alternatively, the method may comprise: displaying the risk zone of the feature such that the risk zone is segmented in segments of different color, shading and/or pattern, wherein the segments correspond to consecutive ranges of risk. In addition or alternatively, the method may comprise: displaying the risk zone of the feature such that the risk zone is fitted to the feature and/or a street on which the feature is present at the current time.

In case the feature is a street curve, the method may comprise: estimating, based on the at least one parameter of the vehicle at the current time, for each virtual position of the virtual positions of the vehicle a lateral acceleration caused by a curvature of the street curve as the respective risk. The virtual positions may be equal to actual positions of different parts of the street curve.

In case the feature is an indicator indicating at least one traffic rule (optionally a traffic sign, a ground marking on a street or a traffic light) or a street intersection, the method may comprise: estimating, based on the at least one parameter of the vehicle at the current time, at each virtual position of the virtual positions of the vehicle a risk of collision as the respective risk. The virtual positions may be arranged at least in an area between the vehicle and the feature and at least one of the virtual positions may be equal to an actual position of the feature or an actual position of a part of the feature. Alternatively, the virtual positions may be arranged at least in an area between the vehicle and the feature and at least one of the virtual positions is equal to a position associated with the actual position of the feature or associated with the actual position of a part of the feature.

The method according to the third aspect of the present invention achieves the same advantages as the advanced driver assistance system according to the first aspect of the present invention.

In order to achieve the method according to the third aspect of the present invention, some or all of the above described optional features may be combined with each other.

A fourth aspect of the present invention provides a program code for performing the method according to the third aspect of the present invention, as described above.

A fifth aspect of the present invention provides a computer program comprising a program code for performing, when implemented on a processor, the method according to the third aspect of the present invention, as described above.

A sixth aspect of the present invention provides a computer comprising a memory and a processor, which are configured to store and execute program code to perform the method according to the third aspect of the present invention, as described above.

The program code of the fourth aspect, the computer program according to the fifth aspect and the computer according to the sixth aspect each achieve the same advantages as the advanced driver assistance system according to the first aspect of the present invention.

FIG. 1 exemplarily shows a flow diagram of an embodiment of the method according to the third aspect of the present invention. In step 100 an environment of the vehicle may be sensed and the sensing output may be provided. In step 200 following step 100, at least one feature of the environment may be determined based on the sensing output. In step 300 following step 200, based on at least one parameter of the vehicle at a current time, at each virtual position of two or more virtual positions of the vehicle a respective risk with regard to the feature may be estimated to estimate for the two or more virtual positions two or more risks. In step 400 following step 300, a risk zone of the feature may be formed based on the two or more risks. In step 500 following step 400, the environment of the vehicle with the feature and the risk zone of the feature may be displayed. The steps 300 and 400 allow determining, for the current time, the risk zone of the feature.

In case of determining in step 200 two or more features, the steps 300 and 400 may be performed for at least one feature of the two or more features generating a risk zone of the at least one feature. In step 500, the environment of the vehicle, the two or more features and the risk zone of the at least one feature of the two or more features may be displayed. Alternatively, the steps 300 and 400 may be performed for each feature of the two or more features. In this case, in step 500, the environment of the vehicle, the two or more features and the risk zone of at least one feature of the two or more features may be displayed. Alternatively, in step 500, the environment of the vehicle, the two or more features and the risk zone for each feature of the two or more features may be displayed.

For a more detailed description on the method of FIG. 1 referenced is made to the above description of the method according to the third aspect of the present invention and the advanced driver assistance system according to the first aspect of the present invention.

Figure 2:
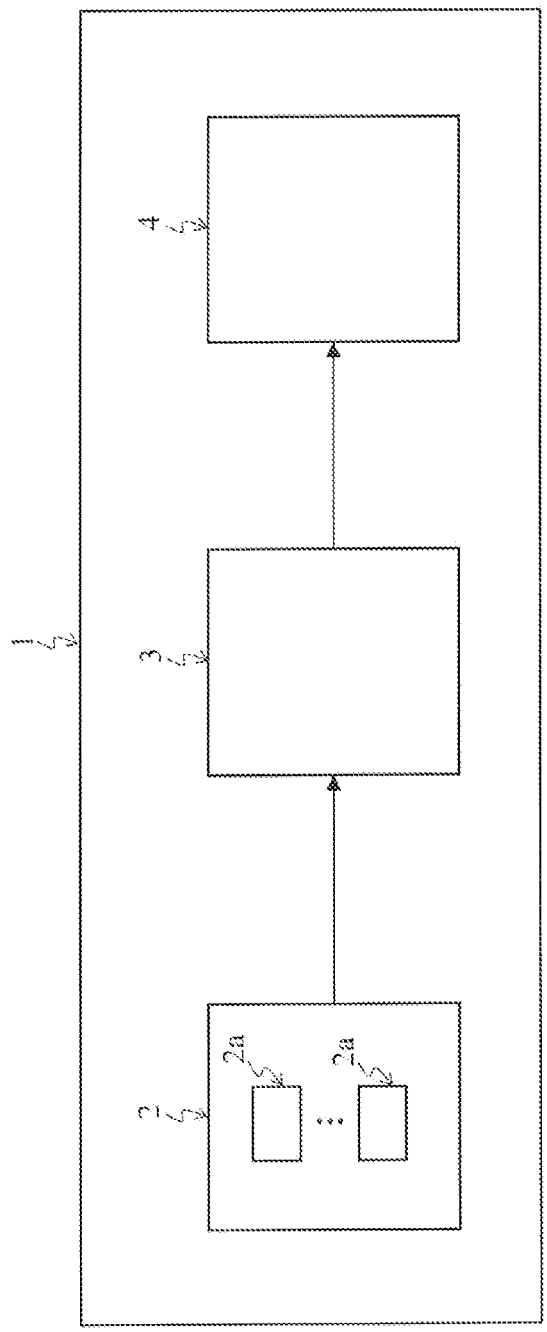
FIG. 2 exemplarily shows a block diagram of an embodiment of the advanced driver assistance system according to the first aspect of the present invention.

FIG. 2 exemplarily shows a block diagram of an embodiment of the advanced driver assistance system according to the first aspect of the present invention.

FIG. 2 shows an advanced driver assistance system 1 for assisting a driver of a vehicle. As shown in FIG. 2, the advanced driver assistance system 1 may comprise a sensor unit 2, a processing unit 3 and a display unit 4. The sensor unit 2 may comprise or correspond to one or more sensors 2a for sensing the environment of the vehicle. The sensor unit 2 may be configured to perform the method step 100 of the method of FIG. 1. The processor unit 3 may be configured to perform the steps 200, 300 and 400 of the method of FIG. 1. The display unit 4 may be configured to perform the step 500 of the method of FIG. 1.

For a more detailed description on the advanced driver assistance system 1, in particular the sensor unit 2, the processing unit 3 and the display unit 4, of FIG. 2, referenced is made to the above description of the advanced driver assistance system according to the first aspect of the present invention. In particular reference is made to the above description of the sensor unit, processing unit and display unit of the advanced driver assistance system according to the first aspect of the present invention.

Figure 3:
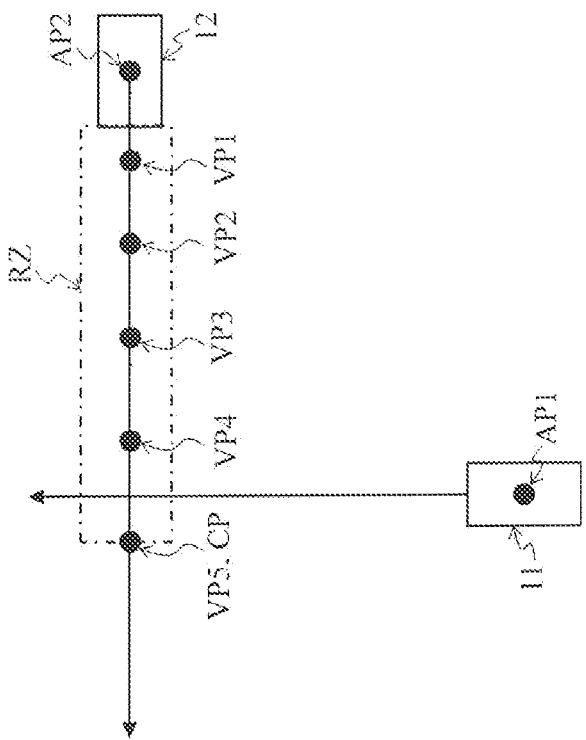
FIG. 3 exemplarily shows two scenarios of using an embodiment of the advanced driver assistance system according to the first aspect of the present invention.
Figure 3:
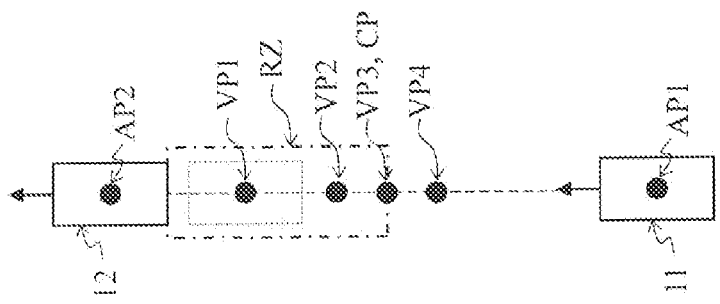
Figure 4:
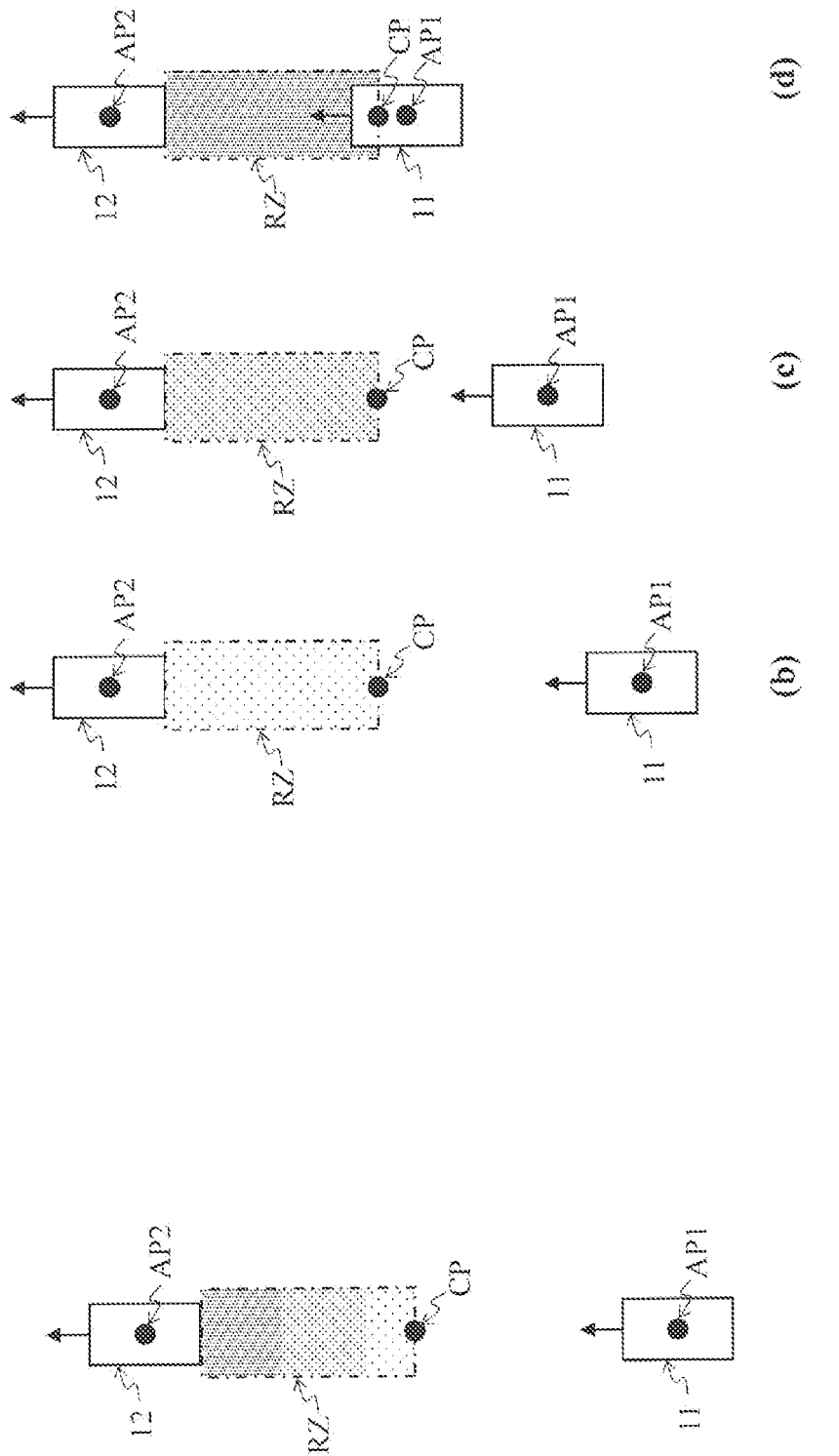
FIG. 4 exemplarily shows a scenario of using an embodiment of the advanced driver assistance system according to the first aspect of the present invention for different conditions.
Figure 5:
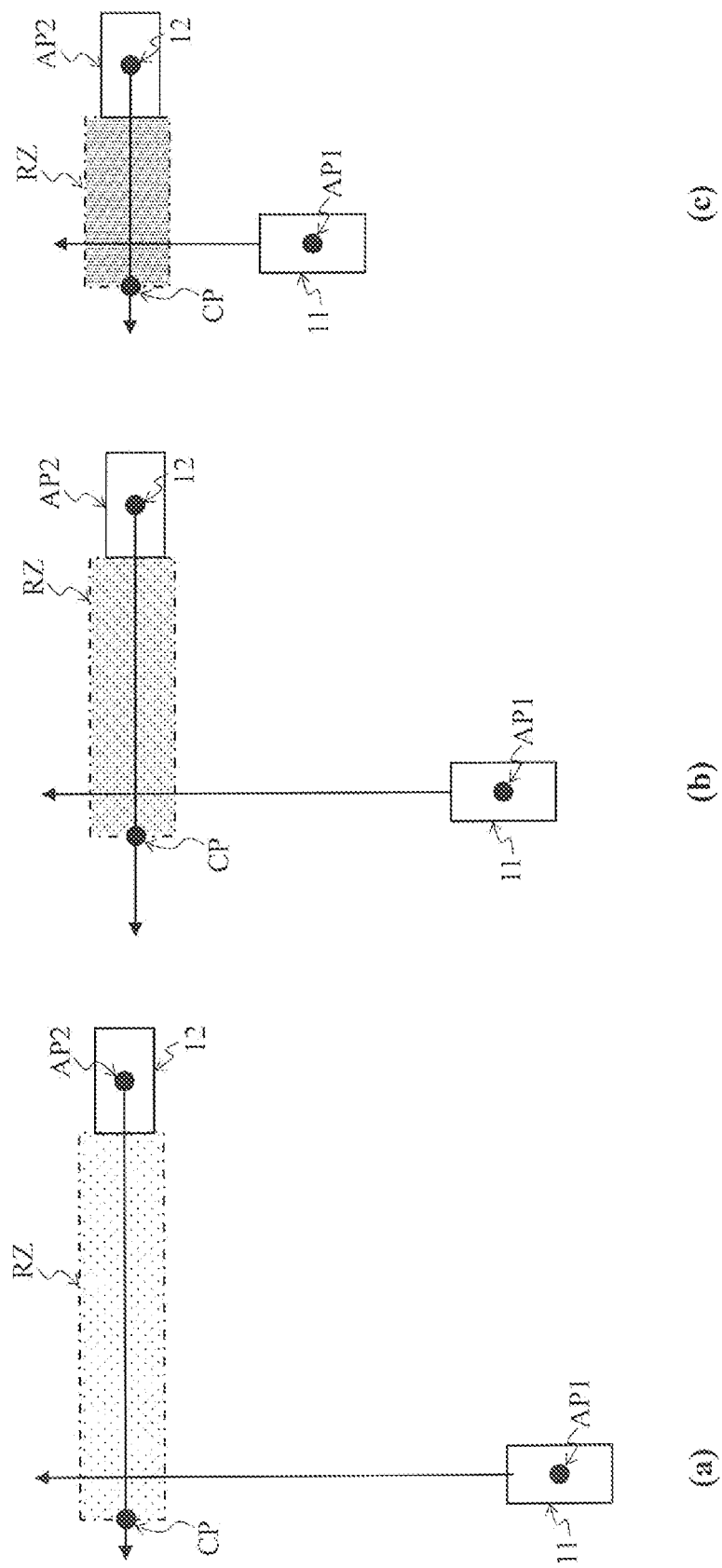
FIG. 5 exemplarily shows a scenario of using an embodiment of the advanced driver assistance system according to the first aspect of the present invention for different conditions.
Figure 6:
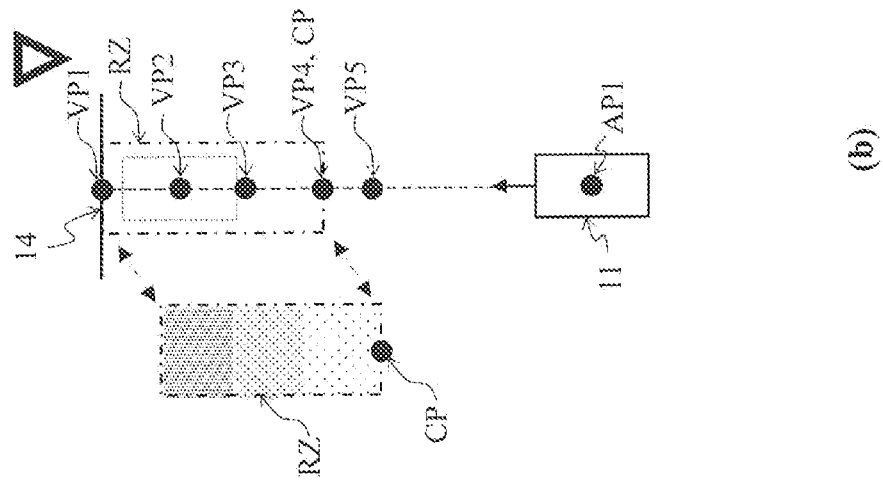
FIG. 6 exemplarily shows two scenarios of using an embodiment of the advanced driver assistance system according to the first aspect of the present invention.
Figure 6:
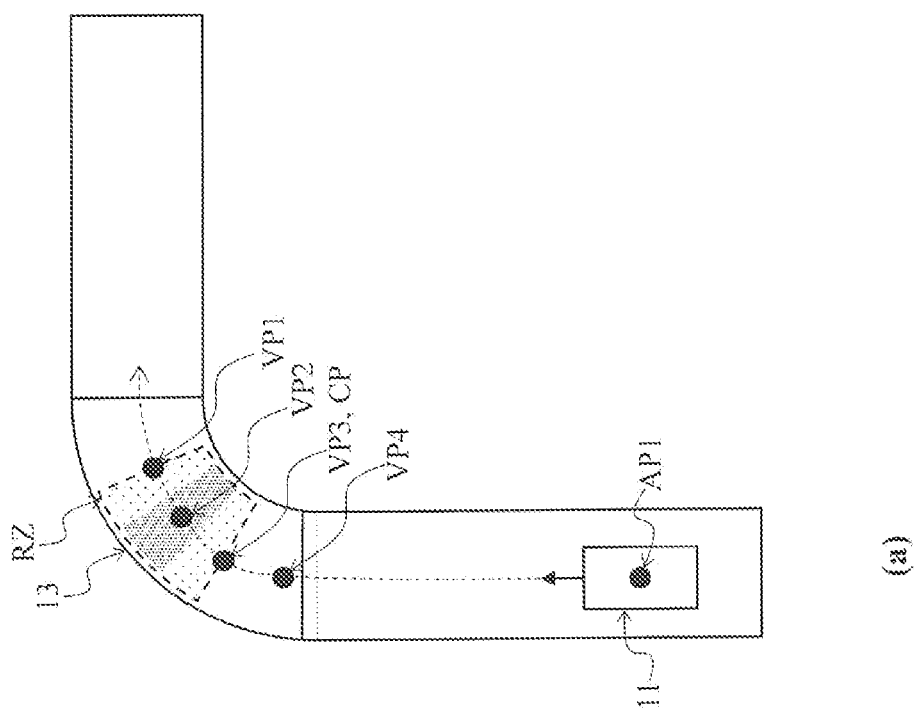

FIGS. 3, 4, 5 and 6 exemplarily show scenarios of using embodiments of the advanced driver assistance system according to the first aspect of the present invention. FIG. 3 (a) shows a scenario, in which a further vehicle 12 is driving in front of a vehicle 11 (ego-vehicle) driven by a driver that is assisted by the advanced driver assistance system according to an embodiment of the invention. Thus, the processing unit of the advanced driver assistance system is configured to determine, based on the sensing output of the sensor unit (sensing the environment of the vehicle 11), the further vehicle 12 as the at least one feature of the environment of the vehicle 11. In FIGS. 3, 4, and 6 the reference sign "AP1" is used to indicated the actual position of the vehicle 11 (i.e. the ego-vehicle) at a current time and in FIGS. 3, 4 and 5 the reference sign "AP2" is used to indicate the actual position of the further vehicle 12 at the current time. In the scenarios of FIGS. 3, 4 and 5 the feature present in the environment of the vehicle 11 is a further vehicle 12. In the scenario of FIG. 6 (a) the feature present in the environment of the vehicle 11 is a street curve 13 and in the scenario of FIG. 6 (b) the feature present in the environment of the vehicle 11 is an indicator 14 indicating at least one traffic rule, in particular a ground marking and/or a traffic sign.

The position of the black circle of the vehicle 11 and the further vehicle 12 for indicating the actual position or the virtual position is only by way of example and may be differently positioned than shown in FIGS. 3, 4, 5 and 6. For example, the black circle of the vehicle 11 for indicating the actual position or virtual positions of the vehicle 11 may be position at the front end, back end or any other position of the vehicle 11.

As shown in the scenario of FIG. 3 (a), for three virtual positions VP1, VP2, and VP3 of the vehicle 11 the processing unit may estimate a respective risk with regard to the further vehicle 12 at the current time, based on at least one parameter of the vehicle at the current time. The number of virtual positions is only by way of example and, thus, does not limit the present invention. The number may be two or more virtual positions. The at least one parameter of the vehicle is exemplarily assumed to be the speed of the vehicle 11. The at least one parameter of the vehicle may comprise or correspond to one or more parameters, as described above with respect to the advanced driver assistance system of the first aspect of the present invention. The respective risk with regard to the further vehicle is exemplarily assumed to be a risk of collision of the vehicle 11 with the further vehicle 12.

As shown in FIG. 3 (a), the virtual positions VP1, VP2 and VP3 of the vehicle 11 are arranged in an area between the vehicle 11 and the further vehicle 12 and they are spatial closer to the actual position AP2 of the further vehicle 12 compared to the actual position AP1 of the vehicle 11. As shown in FIG. 3 (a), the virtual positions VP1, VP2 and VP3 may be arranged along a path between the vehicle 11 and the further vehicle 12 (indicated by the dashed line). Optionally, the path is an estimated driving path of the vehicle 11 at the current time. The three virtual positions may be arbitrary arranged or in an ordered manner, e.g. with an equal distance between the virtual positions. In particular, the virtual positions may form a grid.

The processing unit may be configured to form a risk zone RZ of the further vehicle 12 based on the three estimated risks that are estimated at the three virtual positions VP1, VP2 and VP3 for the current time (i.e. at each virtual position of the three virtual positions VP1, VP2 and VP3 a respective risk of the three estimated risks is estimated for the current time).

As indicated in FIG. 3 (a), the estimation of the risks for forming the risk zone RZ of the further vehicle 12 may optionally be performed by iteratively performing a risk estimation process for a plurality of virtual positions VP1, VP2, VP3 and VP4 of the vehicle 11. In each iteration of the risk estimation process, at a respective virtual position of the plurality of virtual positions a respective risk (e.g. risk of collision of the vehicle 11 with the further vehicle 12) with regard to the further vehicle 12 is estimated based on the at least one parameter of the vehicle 11 (e.g. the speed of the vehicle 11) at the current time. The risk estimation process is stopped after an iteration in which the respective risk is equal to or smaller than a risk threshold.

In the case of FIG. 3 (a), it is exemplarily assumed that the processing unit iteratively performs the risk estimation process for the plurality of virtual positions VP1, VP2, VP3 and VP4 of the vehicle 11 in the order of distances of the plurality of virtual positions VP1, VP2, VP3 and VP4 from the further vehicle 12, starting with the virtual position VP1 that is spatial closest to the further vehicle 12. Further, it is exemplarily assumed that the estimated risk with regard to the further vehicle 12 for the virtual position VP3 for the current time is equal to the risk threshold. Therefore, after estimating for the current time the risk for the virtual position VP3 with regard to the further vehicle 12, the processing unit stops performing the risk estimation process. Therefore, only for the virtual positions VP1, VP2 and VP3 a risk with regard to the further vehicle is estimated for the current time, but no risk is estimated for the current time for the virtual position VP4. Thus, the risk zone RZ of the further vehicle 12 is formed based on the three estimated risks estimated for the three virtual positions VP1, VP2 and VP3. The virtual position VP3 may be stored as a critical position CP defining a start or end of the risk zone RZ of the further vehicle 12.

As shown in FIG. 4 (a), the display unit of the advanced driver assistance system may be configured to display the risk zone RZ of the further vehicle 12 such that the risk zone RZ of the further vehicle 12 is segmented in segments of different color, shading and/or pattern, wherein the segments correspond to consecutive ranges of risks. Since the risk zone RZ of the further vehicle is formed based on three risks that are estimated for the three virtual positions VP1, VP2 and VP3 of the vehicle 11 shown in FIG. 3 (a), the risk zone RZ of the further vehicle 12 may be segmented into three segments, wherein the border of the three segments correspond to the three estimated risks.

The segment of the risk zone RZ (most densely dotted segment of FIG. 4 (a)) between the further vehicle 12 and the virtual position VP1 corresponds to a range of risks greater than or equal to the risk estimated for the virtual position VP1 for the current time. In case the estimated risk corresponds to a risk of collision, then that range of risks is between a risk of 100% at the border of the risk zone RZ of the further vehicle 12 with the further vehicle 12 and the risk of collision estimated for the virtual position VP1 for the current time. Namely, in case the vehicle 11 would be positioned at the border of the risk zone RZ with the further vehicle 12, there would be a collision between the vehicle 11 and the further vehicle 12. The consecutive segment (second most densely dotted segment of FIG. 4 (a)) of the risk zone RZ between the virtual position VP1 and the virtual position VP2 corresponds to a range of risks smaller than the risk estimated for the virtual position VP1 for the current time and greater than or equal to the risk estimated for the virtual position VP2 for the current time. The consecutive segment (least densely dotted segment of FIG. 4 (a)) of the risk zone RZ between the virtual position VP2 and the virtual position VP3 corresponds to a range of risks smaller than the risk estimated for the virtual position VP2 for the current time and greater than or equal to the risk estimated for the virtual position VP3 for the current time.

Thus, as shown in FIGS. 3 (a) and 4 (a), the risk zone RZ of the further vehicle 12 corresponds to a personal space of the further vehicle 12. As long as the vehicle 11 does not invade that risk zone RZ, the risk with regard to the further vehicle 12 (e.g. the risk of collision of the vehicle 11 with the further vehicle 12) is smaller than the risk estimated for the virtual position VP3 at the current time and, thus, smaller than a risk threshold. The risk zone RZ of the vehicle 12 (when displayed on the display unit) allows the driver of the vehicle 11 to intuitively assess the risk situation of the vehicle 11 with regard to the further vehicle 12 by visualizing theoretical risks with regard to the further vehicle 12 for the virtual positions VP1, VP2 and VP3. The virtual positions VP1, VP2 and VP3 are different from the actual position AP1 of the vehicle 11 at the current time, in particular spatial closer to the further vehicle 12 compared to the actual position AP1 of the vehicle 11 at the current time.

As shown in FIGS. 4 (b), (c) and (d), additionally or alternatively, the display unit of the advanced driver assistance system may be configured to display the risk zone RZ of the further vehicle 12 by changing the color, shading and/or pattern of the risk zone depending on a distance between an border of the risk zone RZ and an actual position of the vehicle 11 at the current time. The border is indicated in FIGS. 4 (b), (c) and (d) by a critical position CP. In FIG. 4 (b) the vehicle 11 is furthest spatial away from the border of the risk zone RZ of the further vehicle 12. In FIG. 4 (c) the vehicle 11 is spatially closer to the border of the risk zone RZ compared to FIG. 4 (b), but still not intersecting with the border. In FIG. 4 (d), the vehicle 11 is intersecting the border of the risk zone RZ. The spatial closer the vehicle 11 to the further vehicle 12 the greater the risk (e.g. risk of collision) with regard to the further vehicle 12. Therefore, the risk zone RZ of FIG. 4 (d) may be colored in a warning color, e.g. red. The risk zone of FIG. 4 (c) may be colored in an awareness raising color, e.g. orange or yellow. The risk zone RZ of FIG.

4 (*b*) may be colored in a color indicating a low risk state (secure state) of the vehicle 11 with regard to the further vehicle 12, e.g. green. In FIG. 4 the different colors, shadings and/or pattern of segments of the risk zone RZ or of the risk zone itself are indicated by differently densely dotted areas.

The display unit of the advanced driver assistance system may be configured to alternately display the risk zone according to the embodiment of FIG. 4 (*a*) and the embodiment of FIGS. 4 (*b*), (*c*) and (*d*). Additionally or alternatively, the driver may select the type of display of the risk zone RZ by the display unit for the scenario of FIG. 3 (*a*).

FIG. 3 (*b*) exemplarily shows a further scenario of using an embodiment of the advanced driver assistance system according to the first aspect of the present invention. In the scenario of FIG. 3 (*b*), a vehicle 11 (ego-vehicle), driven by a driver that is assisted by the advanced driver assistance system, and a further vehicle 12 drive such that the driving path of the vehicle 11 and the driving path of the further vehicle 12 perpendicularly intersect each other, e.g. at a street intersection. The above description with respect to FIGS. 3 (*a*) and 4 (*a*), (*b*), (*c*) and (*d*) is correspondingly valid for describing the scenario of FIG. 3 (*b*).

According to the scenario of FIG. 3 (*b*) at five virtual positions VP1, VP2, VP3, VP4 and VP5 of the vehicle 11 the risk with regard to the further vehicle 12 for the current time is estimated by the processing unit of the advanced driver assistance system, based on the at least one parameter of the vehicle 11 at the current time. The virtual positions VP1, VP2, VP3, VP4 and VP5 may be arranged along a path, wherein the path is an estimated movement path of the further vehicle 12. Based on the virtual positions VP1, VP2, VP3, VP4 and VP5 the processing unit may form the risk zone RZ of the further vehicle 12.

As shown in FIGS. 5 (*a*), (*b*) and (*c*), the display unit of the advanced driver assistance system may be configured to display the risk zone RZ of the further vehicle 12 by changing the color, shading and/or pattern of the risk zone depending on a distance between an border of the risk zone RZ and an actual position of the vehicle 11 at the current time. In FIG. 5 (*a*) the vehicle 11 is furthest spatial away from the border of the risk zone RZ of the further vehicle 12. In FIG. 5 (*b*) the vehicle 11 is spatially closer to the border of the risk zone RZ compared to FIG. 5 (*a*). In FIG. 5 (*c*), the vehicle 11 is spatially closer to the border of the risk zone RZ compared to FIGS. 5 (*a*) and (*b*). The above description with regard to FIGS. 4 (*b*), (*c*) and (*d*) is correspondingly valid for describing the scenario of FIGS. 5 (*a*), (*b*) and (*c*), in particular for describing a different coloring of the risk zone RZ of the further vehicle 12.

FIG. 6 (*a*) exemplarily shows a further scenario of using an embodiment of the advanced driver assistance system according to the first aspect of the present invention. In the scenario of FIG. 6 (*a*), the vehicle 11 (ego-vehicle), driven by a driver assisted by the advanced driver assistance system, drives along a street with a street curve 13 ahead. Thus, the processing unit of the advanced driver assistance system is configured to determine, based on the sensing output of the sensor unit (sensing the environment of the vehicle 11), the street curve 13 as the at least one feature of the environment of the vehicle 11.

As shown in the scenario of FIG. 6 (*a*), for three virtual positions VP1, VP2, and VP3 of the vehicle 11 the processing unit may estimate a respective risk with regard to the street curve 13 at the current time, based on at least one parameter of the vehicle at the current time. The number of virtual positions is only by way of example and, thus, does not limit the present invention. The number may be two or more virtual positions. The at least one parameter of the vehicle is exemplarily assumed to be the speed of the vehicle 11 at the current time. The at least one parameter of the vehicle may comprise or correspond to one or more parameters, as described above with respect to the advanced driver assistance system of the first aspect of the present invention. The respective risk with regard to the further vehicle is exemplarily assumed to be a risk of lateral acceleration of the vehicle 11 and/or a risk of lane departure of the vehicle 11.

As shown in FIG. 6 (*a*), the virtual positions VP1, VP2 and VP3 of the vehicle 11 are arranged in the environment of the vehicle 11 such that the virtual positions VP1, VP2 and VP3 are each equal to an actual position of a part of the street curve 13. As shown in FIG. 3 (*a*), the virtual positions VP1, VP2 and VP3 may be arranged along a path that is fitted to the street curve 13. Optionally, the path is an estimated driving path of the vehicle 11 at the current time. The three virtual positions may be arbitrary arranged or in an ordered manner, e.g. with an equal distance between the virtual positions. In particular, the virtual positions may form a grid.

The processing unit may be configured to form a risk zone RZ of the street curve 13 based on the three estimated risks that are estimated at the three virtual positions VP1, VP2 and VP3 for the current time (i.e. at each virtual position of the three virtual positions VP1, VP2 and VP3 a respective risk of the three estimated risk is estimated for the current time).

As indicated in FIG. 6 (*a*), the estimation of the risks for forming the risk zone RZ of the street curve 13 may optionally be performed by iteratively performing a risk estimation process for a plurality of virtual positions VP1, VP2, VP3 and VP4 of the vehicle 11. In each iteration of the risk estimation process, at a respective virtual position of the plurality of virtual positions a respective risk (e.g. risk of lateral acceleration and/or risk of lane departure of the vehicle 11) with regard to the street curve 13 is estimated based on the at least one parameter of the vehicle 11 (e.g. the speed of the vehicle 11) at the current time. The risk estimation process is stopped after an iteration in which the respective risk is equal to or smaller than a risk threshold. In the case of FIG. 6 (*a*), it is exemplarily assumed that the processing unit iteratively performs the risk estimation process for the plurality of virtual positions VP1, VP2, VP3 and VP4 of the vehicle 11 in the order of distances of the plurality of virtual positions VP1, VP2, VP3 and VP4 from the actual position AP1 of the vehicle 11, starting with the virtual position VP1 that is spatially furthest away from the actual position AP1 of the vehicle 11. Further, it is exemplarily assumed that the estimated risk with regard to the street curve 13 for the virtual position VP3 for the current time is equal to the risk threshold. Therefore, after estimating for the current time the risk for the virtual position VP3 with regard to the street curve 13, the processing unit stops performing the risk estimation process. Therefore, only for the virtual positions VP1, VP2 and VP3 a risk with regard to the street curve 13 is estimated for the current time, but no risk is estimated for the current time for the virtual position VP4. Thus, the risk zone RZ of the street curve 13 is formed based on the three estimated risks estimated for the three virtual positions VP1, VP2 and VP3.

As shown in FIG. 6 (*a*), the display unit of the advanced driver assistance system may be configured to display the risk zone RZ of the street curve such that the risk zone RZ may be segmented in segments of different color, shading and/or pattern, wherein the segments correspond to consecutive ranges of risks. Since the risk zone RZ of the further vehicle is formed on three risks that are estimated for the three virtual positions VP1, VP2 and VP3 of the vehicle 11, the risk zone RZ may be segmented into three segments. The segment of the risk zone RZ (most densely dotted segment of FIG. 6 (a)) comprising the virtual position VP2 corresponds to a range of high risks comprising the risk estimated for the virtual position VP2 for the current time. The consecutive segment on the left and right correspond to a range of lower risks that comprise the risk estimated for the virtual position VP1 for the current time (cf. segment on the right side) respectively the risk estimated for the virtual position VP3 for the current time (cf. segment on the left side). The range of lower risks comprise risks that are smaller than the risks of the range of higher risks.

For example, in case the estimated risks are risks of lateral acceleration (acceleration lateral or sideward to the direction of movement), which is cause by the curvature of the street curve 13, the estimated risk estimated at a position of greatest curvature will be greater compared to an estimated risk estimated at a position of smaller curvature. At the virtual position VP2 the curvature of the street curve 13 is greater than the curvature of the street curve 13 at the virtual positions VP1 and VP3. Therefore, the risk of lateral acceleration estimated for the virtual position VP2 is greater than the risks of lateral acceleration estimated for the virtual positions VP1 and VP3. It is exemplarily assumed that the curvature of the street curve 13 at the virtual position VP1 is greater than the curvature of the street curve 13 at the virtual position VP3. Therefore, the risk of lateral acceleration estimated for the virtual position VP1 is greater than the risk of lateral acceleration estimated for the virtual position VP3.

According to FIG. 6 (a), the risk zone RZ is fitted to the street curve 13 and, thus, to the course and shape of the street. The risk zone RZ may be differently arranged and, thus, may be differently displayed.

Thus, as shown in FIG. 6 (a), the risk zone RZ of the street curve 13 corresponds to a personal space of the street curve 13. As long as the vehicle 11 does not invade that risk zone, the risk with regard to the street curve 13 (e.g. the risk of lateral acceleration caused by the curvature of the street curve) is smaller than the risk estimated for the virtual position VP3 at the current time and, thus, smaller than a risk threshold. The risk zone RZ of the street curve 13 (when displayed on the display unit) allows the driver of the vehicle 11 to intuitively assess the risk situation of the vehicle 11 with regard to the street curve 13 by visualizing theoretical risks with regard to the street curve 13 for the virtual positions VP1, VP2 and VP3. The virtual positions VP1, VP2 and VP3 are different from the actual position AP1 of the vehicle 11 at the current time.

FIG. 6 (b) shows a scenario, in which an indicator 14 indicating at least one traffic rule, e.g. a ground marking on a street and/or a traffic sign, is in front of the vehicle 11, driven by a driver that is assisted by the advanced driver assistance system according to an embodiment of the invention. For the further description, it is exemplarily assumed that the indicator 14 indicating at least one traffic rule is a traffic sign 14. This is not limiting for the present description and, thus, the description is also valid for any other indicator indicating at least one traffic rule. Thus, the processing unit of the advanced driver assistance system is configured to determine, based on the sensing output of the sensor unit (sensing the environment of the vehicle 11), the traffic sign 14 as the at least one feature of the environment of the vehicle 11.

As shown in the scenario of FIG. 6 (b), for four virtual positions VP1, VP2, VP3 and VP4 of the vehicle 11 the processing unit may estimate a respective risk with regard to the traffic sign 14 at the current time, based on at least one parameter of the vehicle at the current time. The number of virtual positions is only by way of example and, thus, does not limit the present invention. The number may be two or more virtual positions. The at least one parameter of the vehicle is exemplarily assumed to be the speed of the vehicle 11 at the current time. The at least one parameter of the vehicle may comprise or correspond to one or more parameters, as described above with respect to the advanced driver assistance system of the first aspect of the present invention. The respective risk with regard to the further vehicle is exemplarily assumed to be a risk of violation of traffic rules (indicated by the traffic sign).

As shown in FIG. 6 (b), the virtual positions VP1, VP2, VP3 and VP4 of the vehicle 11 are arranged at least in an area between the vehicle 11 and the traffic sign 14 and the virtual position VP1 of the virtual positons is equal to a position associated with an actual position of the traffic sign 14. The virtual positions are spatial closer to the actual position of the traffic sign 14 compared to the actual position AP1 of the vehicle 11. As shown in FIG. 6 (b), the virtual positions VP1, VP2, VP3 and VP4 may be arranged along a path between the vehicle 11 and the position associated with the actual position of the traffic sign (indicated by the dashed line). Optionally, the path is an estimated driving path of the vehicle 11 at the current time. The four virtual positions may be arbitrary arranged or in an ordered manner, e.g. with an equal distance between the virtual positions. In particular, the virtual positions may form a grid.

The processing unit may be configured to form a risk zone RZ of the traffic sign 14 based on the four estimated risks that are estimated at the four virtual positions VP1, VP2, VP3 and VP4 for the current time (i.e. at each virtual position of the four virtual positions VP1, VP2, VP3 and VP4 a respective risk of the four estimated risk is estimated for the current time).

As indicated in FIG. 6 (b), the estimation of the risks for forming the risk zone RZ of the street sign 14 may optionally be performed by iteratively performing a risk estimation process for a plurality of virtual positions VP1, VP2, VP3, VP4 and VP5 of the vehicle 11. In each iteration of the risk estimation process, at a respective virtual position of the plurality of virtual positions a respective risk (e.g. risk of violation of traffic rules indicated by the traffic sign 14) with regard to the traffic sign 14 is estimated based on the at least one parameter of the vehicle 11 (e.g. the speed of the vehicle 11) at the current time. The risk estimation process is stopped after an iteration in which the respective risk is equal to or smaller than a risk threshold.

In the case of FIG. 6 (b), it is exemplarily assumed that the processing unit iteratively performs the risk estimation process for the plurality of virtual positions VP1, VP2, VP3, VP4 and VP5 of the vehicle 11 in the order of distances of the plurality of virtual positions Vp1, VP2, VP3, VP4 and VP5 from the traffic sign 14, starting with the virtual position VP1 that is spatial closest to the traffic sign 14. Further, it is exemplarily assumed that the estimated risk with regard to the traffic sign 14 at the virtual position VP4 for the current time is equal to the risk threshold. Therefore, after estimating for the current time the risk for the virtual position VP4 with regard to the traffic sign 14, the processing unit stops performing the risk estimation process. Therefore, only for the virtual positions VP1, VP2, VP3 and VP4 a risk with regard to the traffic sign 14 is estimated for the current time, but no risk is estimated for the current time for the virtual position VP5. Thus, the risk zone RZ of the traffic sign 14 is formed based on the four estimated risks estimated for the four virtual positions VP1, VP2, VP3 and VP4. The virtual position VP4 may be stored as a critical position CP defining a start or end of the risk zone RZ of the traffic sign 14.

As shown in FIG. 6 (b), the display unit of the advanced driver assistance system may be configured to display the risk zone RZ of the traffic sign 14 such that the risk zone RZ is segmented in segments of different color, shading and/or pattern, wherein the segments correspond to consecutive ranges of risks. The risk zone RZ may be segmented into three segments, wherein the border of the three segments correspond to four estimated risks that are estimated for the four virtual positions VP1, VP2, VP3 and VP4 of the vehicle 11. The segment of the risk zone RZ (most densely dotted segment of FIG. 6 (b)) between the virtual position VP1 and the virtual positon VP2 corresponds to a range of risks smaller than or equal to the risk estimated for the virtual positon VP1 for the current time and greater than the risk estimated for the virtual position VP2 for the current time. The consecutive segment (second most densely dotted segment of FIG. 6 (b)) of the risk zone RZ between the virtual position VP2 and the virtual position VP3 corresponds to a range of risks smaller than or equal to the risk estimated for the virtual positon VP2 for the current time and greater than the risk estimated for the virtual position VP3 for the current time. The consecutive segment (least densely dotted segment of FIG. 6 (b)) of the risk zone RZ between the virtual position VP3 and the virtual position VP4 corresponds to a range of risks smaller than or equal to the risk estimated for the virtual positon VP3 for the current time and greater than the risk estimated for the virtual position VP4 for the current time.

Thus, as shown in FIG. 6 (b), the risk zone RZ of the traffic sign 14 corresponds to a personal space of the traffic sign 14. The risk zone RZ of the traffic sign 14 (when displayed on the display unit) allows the driver of the vehicle 11 to intuitively assess the risk situation of the vehicle 11 with regard to the traffic sign 14 by visualizing theoretical risks with regard to the traffic sign 14 for the virtual positions VP1, VP2, VP3 and VP4. The virtual positions VP1, VP2, VP3 and VP4 are different from the actual position AP1 of the vehicle 11 at the current time, in particular spatial closer to the traffic sign 14 compared to the actual position AP1 of the vehicle 11 at the current time.

The description of the advanced driver assistance system according to the first aspect of the present invention is correspondingly valid for the embodiments of FIGS. 3, 4, 5 and 6.

FIGS. 7 to 12 show examples of outputs that may be displayed by the display unit of an embodiment of the advanced driver assistance system according to the first aspect of the present invention.

Figure 7:
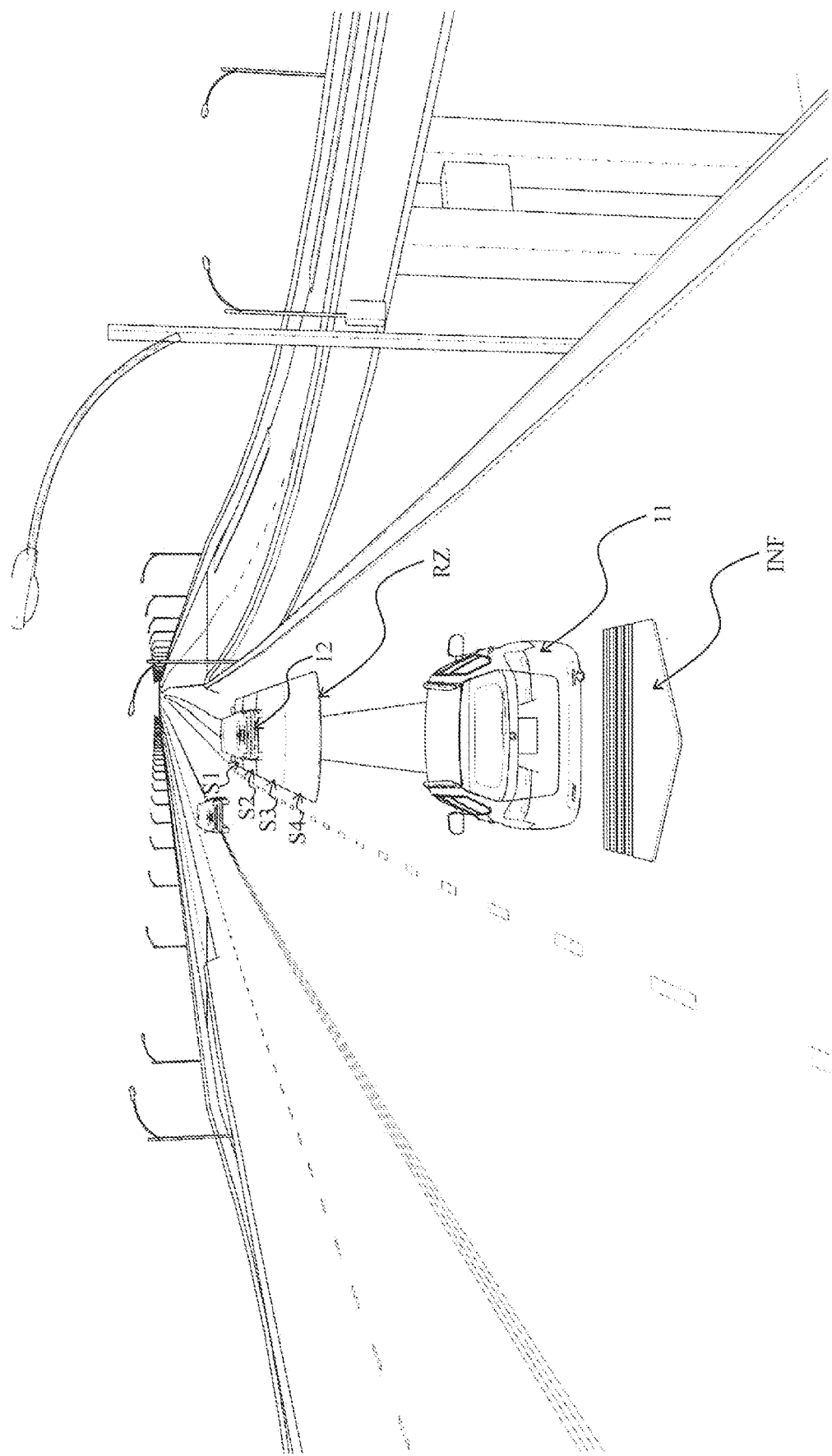
Figure 8:
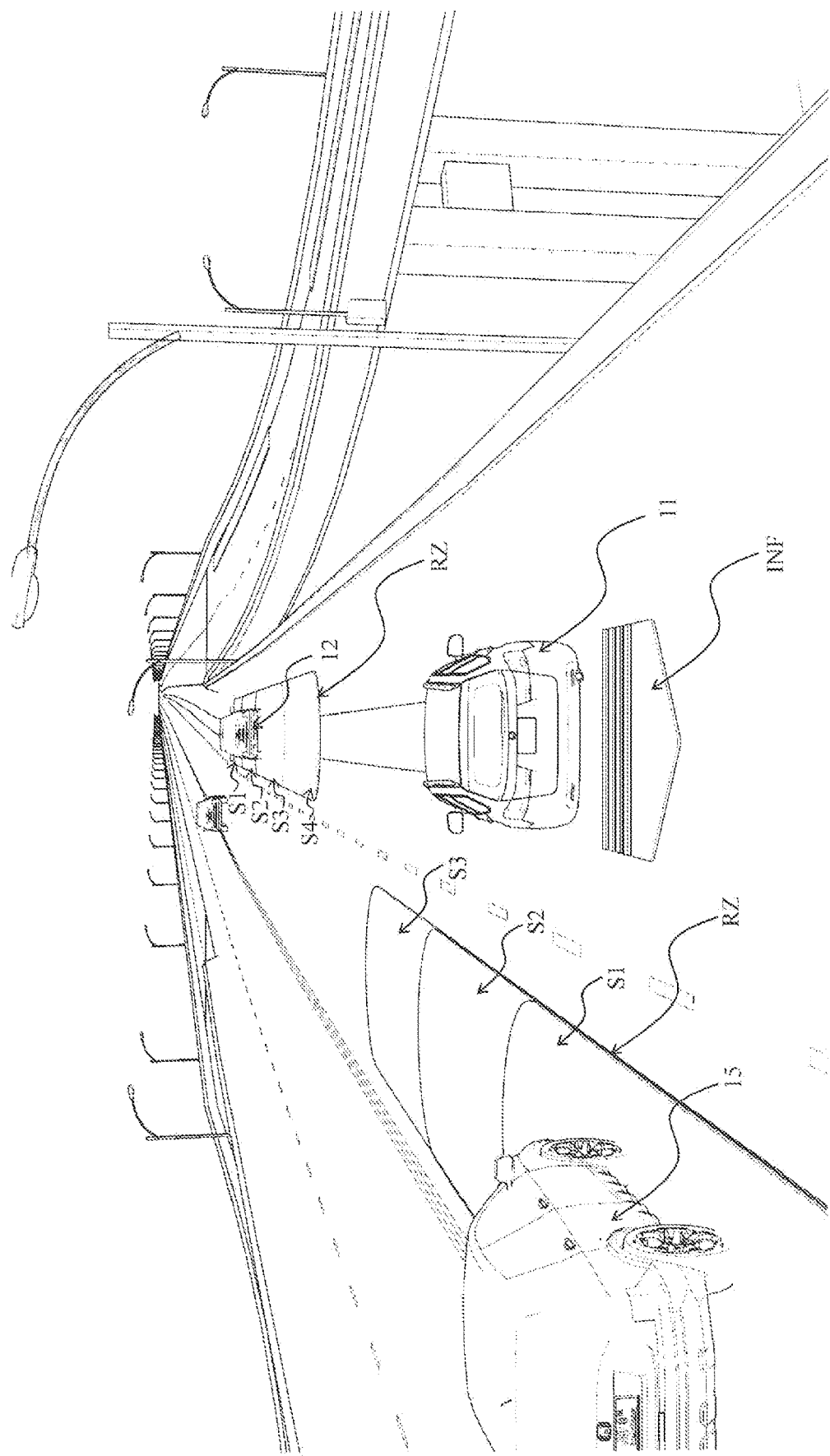
Figure 9:
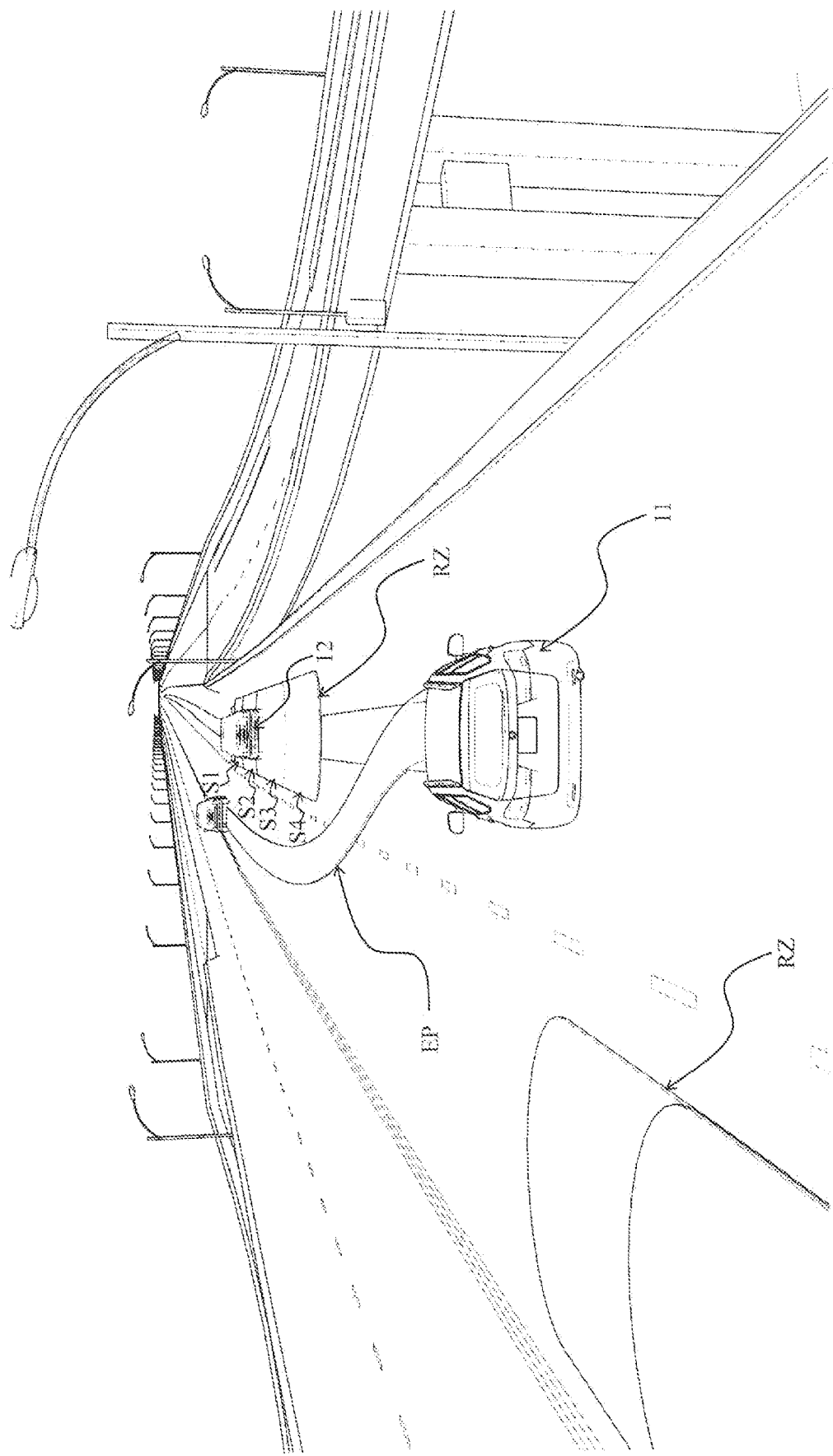
Figure 10:
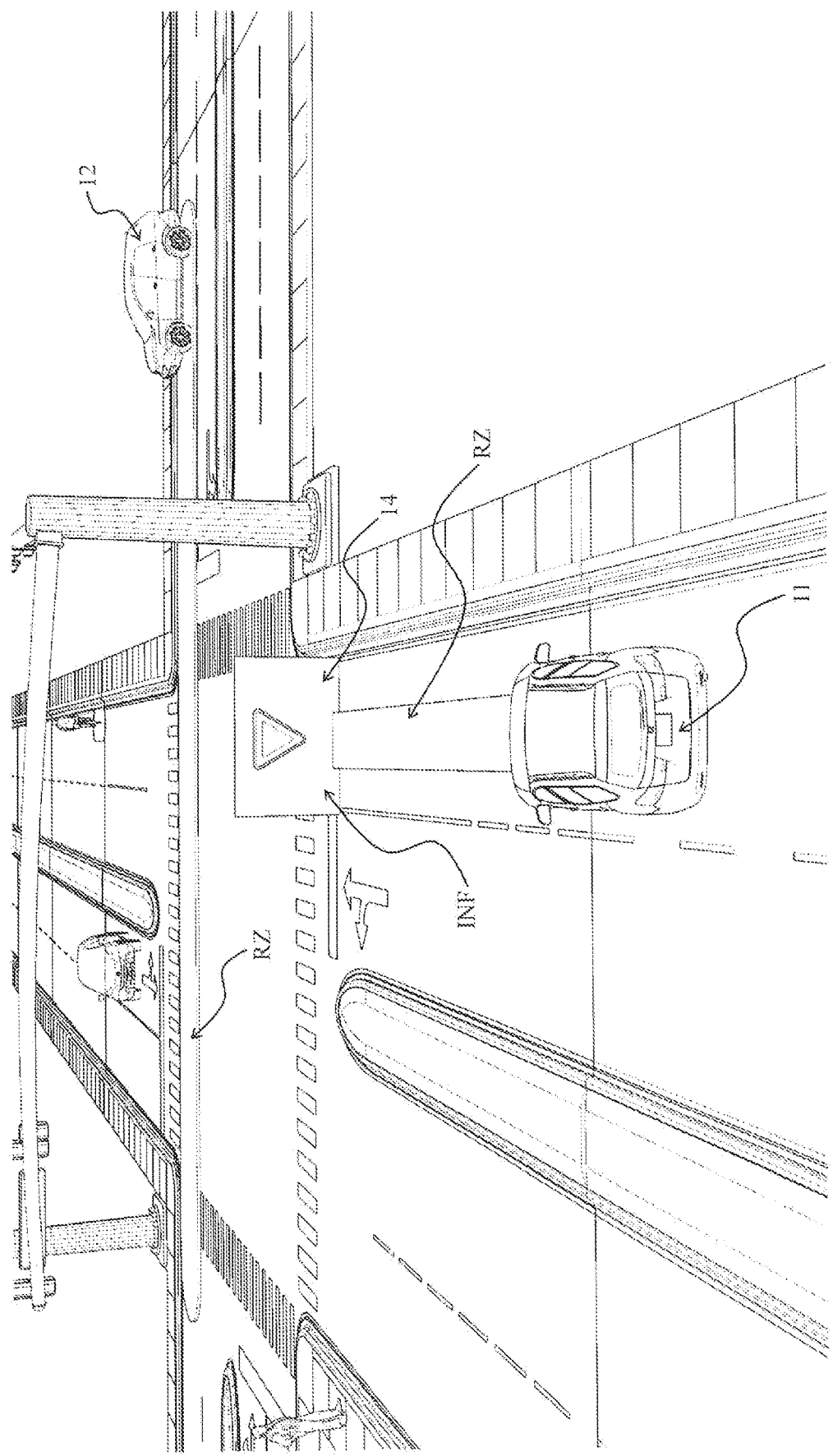
Figure 11:
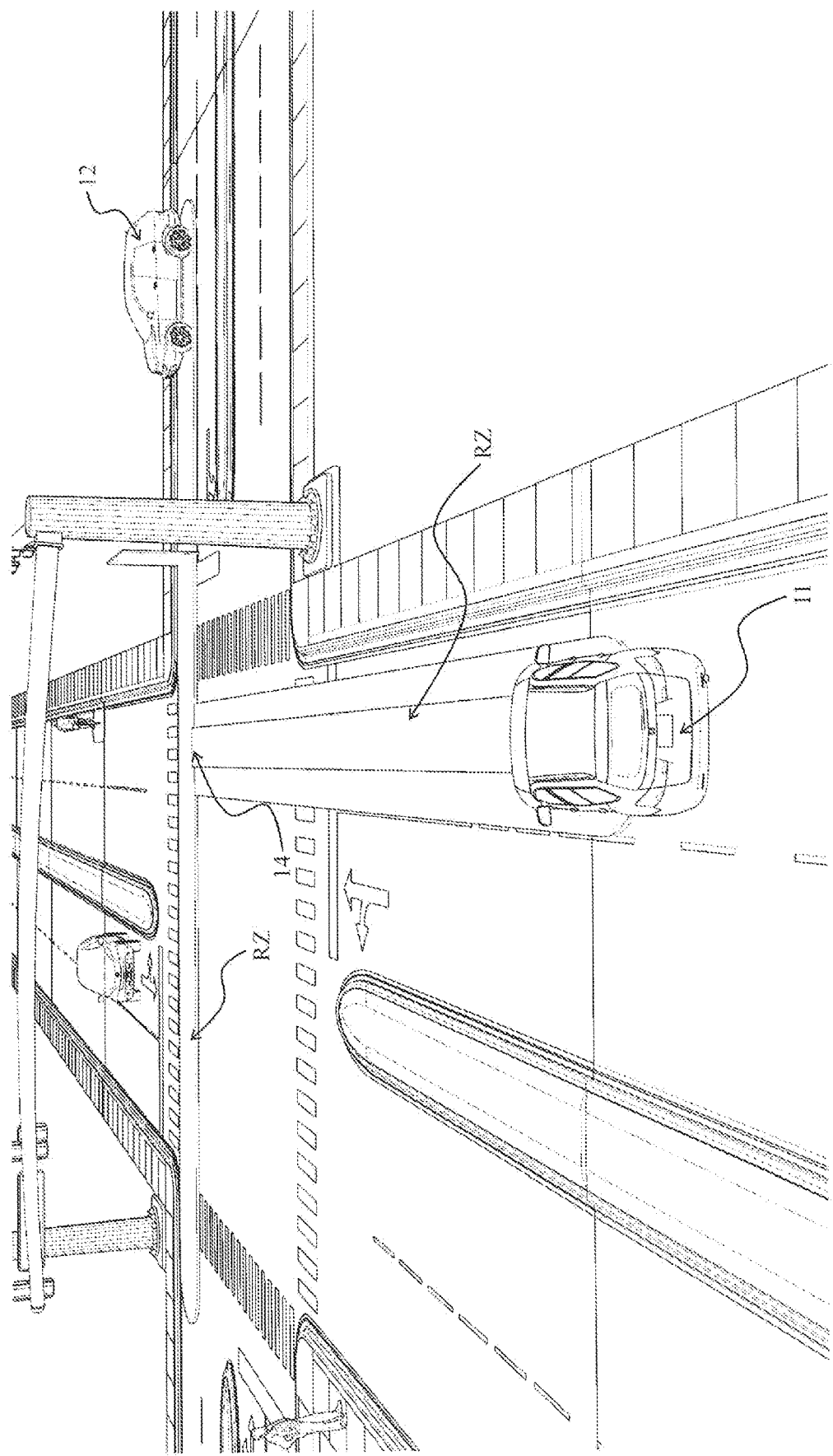

In FIGS. 7 to 12 the vehicle (ego-vehicle), driven by a driver that is assisted by the advanced driver assistance system according to an embodiment of the invention, is associated with the reference sign "11". The risk zone of a feature present in the environment of the vehicle 11 is associated with the reference sign "RZ". Different segments of a risk zone RZ, shown in FIGS. 7, 8 and 9, are associated with reference signs "S1", "S2", "S3" and "S4". In FIGS. 7, 8, 9, 10 and 11 one or two features of the environment of the vehicle 11 determined by the processing unit of the advanced driver assistance system correspond to one further vehicle 12 (cf. FIGS. 7, 10 and 11) or to two further vehicles 12 and 15 (cf. FIGS. 8 and 9). In FIG. 10 an additional feature of the environment of the vehicle 11 determined by the processing unit corresponds to an indicator 14 indicating at least one traffic rule. In FIG. 11 an additional feature of the environment of the vehicle 11 determined by the processing unit corresponds to a street intersection 14. In FIG. 12 a feature of the environment of the vehicle 11 determined by the processing unit corresponds to a street curve 13.

As exemplarily shown in FIG. 7, the display unit may display the risk zone RZ of a further vehicle 12, driving in front of the vehicle 11 (ego-vehicle), wherein the risk zone RZ has been generated by the processing unit of the advanced driver assistance system. As indicated in FIG. 7, the risk zone RZ of the further vehicle 12 may comprise the further vehicle 12. Thus, risks with regard to the further vehicle 12 may be estimated at one or more virtual positions of the vehicle 11 that are not only arranged in an area between the vehicle 11 and the further vehicle 12, but also on the side and/or in front of the further vehicle 12. Further, as indicated in FIG. 7, the display unit may be configured to display information INF instructing the driver on a driving behavior (e.g. instruction to reduce speed, to brake etc.). The instruction may be dependent on the actual position of the vehicle 11 with regard to the risk zone RZ of the further vehicle 12, in particular it may be dependent on a distance between the actual position of the vehicle 11 and the border of the risk zone RZ of the further vehicle 12. For example, the arrows INF may indicate to the driver of the vehicle 11 to reduce a speed, wherein a color and/or size of the arrows INF may indicate different magnitudes of speed reduction.

FIG. 8 substantially corresponds to FIG. 7, wherein an additional vehicle 15, driving on the left side of the vehicle 11, is determined by the processing unit of the advanced driver assistance system as a further feature of the environment of the vehicle 11. Therefore, the processing unit also generates a risk zone RZ for the additional vehicle and the display unit displays the further vehicle 12 with the respective risk zone RZ and the additional vehicle 15 with the respective risk zone RZ.

FIG. 9 substantially corresponds to the FIG. 8, wherein at the current time of FIG. 9 the additional vehicle 15 (shown in FIG. 8) is not displayed anymore and only a part of the risk zone RZ of the additional vehicle 15 is displayed. This may be because at the current time of FIG. 9 the additional vehicle 15 is not any more present at the left side of the vehicle 11 due to the driving of the vehicle 11. As indicated in FIG. 9, the display unit may additionally display an estimated driving path EP of the vehicle 11.

FIG. 10 exemplarily shows an scenario, in which the vehicle 11 (ego-vehicle) drives to a street intersection. The processing unit of the advanced driver assistance system determines a further vehicle 12 driving from the right side of the vehicle 11 to the street intersection, as a feature present in the environment of the vehicle 11. The driving direction of the vehicle 11 and the driving direction of the further vehicle 12 perpendicularly intersect each other. The processor unit further determines an indicator 14 indicating at least one traffic rule, e.g. a ground marking on the street and/or a traffic sign, as a further feature present in the environment of the vehicle 11. For each feature, that is the further vehicle 12 and the indicator 14 indicating at least one traffic rule, the processing unit may determine a risk zone RZ. The display unit may display the risk zone RZ of the further vehicle 12 and the risk zone of the indicator 14 indicating at least one traffic rule, as shown in FIG. 10. The display unit may display further information INF, such as the type of indicator 14. In FIG. 10, the indicator 14 is exemplarily a traffic sign requesting a driver to give way to another vehicle at the street intersection.

FIG. 11 corresponds to FIG. 10, wherein FIG. 11 differs from FIG. 10 in that the processing unit generates the risk zone RZ with regard to the street intersection 14 instead of generating a risk zone with respect to an indicator indicating at least one traffic rule. Thus, according to FIG. 11, the display unit displays the risk zone RZ of the street intersection 14 in addition to the risk zone of the further vehicle 12.

FIG. 12 exemplarily shows a scenario, in which the vehicle 11 (ego-vehicle) drives on a street comprising a street curve 13 in front of the vehicle 11. The processing unit may determine the street curve 13 as a feature present in the environment of the vehicle 11. Further, the processing unit may determine a risk zone RZ of the street curve 13 and the display unit may display the risk zone RZ of street curve 13. The display unit may display further information INF. This further information may for example indicated a position in the risk zone RZ of the street curve 13 at which a risk with regard to the street curve, e.g. a risk of lateral acceleration caused by the curvature of the street curve 13, is greatest. As indicated in FIG. 12, the display unit may additionally display an estimated driving path EP of the vehicle 11.

The description of FIGS. 3 (a) and 4 may be valid for the embodiments of FIGS. 7, 8 and 9. The description of FIGS. 3 (b), 5 and 6 (b) may be valid for the embodiments of FIGS. 10 and 11. The description of FIG. 6 (a) may be valid for the embodiment of FIG. 12.

The description of the advanced driver assistance system according to the first aspect of the present invention is correspondingly valid for the embodiments of FIGS. 7 to 12.

What is claimed is:

1. An advanced driver assistance system for assisting a driver of a vehicle, wherein
the system comprises a sensor unit, a processing unit and a display unit;
the sensor unit is configured to sense an environment of the vehicle and provide a sensing output to the processing unit;
the processing unit is configured to determine, based on the sensing output, at least one feature of the environment;
the processing unit is configured to determine, for a current time, a risk zone of the feature, by:
estimating, based on at least one parameter of the vehicle at the current time, at each virtual position of two or more virtual positions of the vehicle a respective risk with regard to the feature to estimate for the two or more virtual positions two or more risks, and
forming the risk zone based on the two or more risks; and
the display unit is configured to display the environment of the vehicle with the feature and the risk zone of the feature.

2. The advanced driver assistance system according to claim 1, wherein,
the processing unit is configured to determine, for the current time, the risk zone of the feature by:
iteratively performing a risk estimation process for a plurality of virtual positions of the vehicle comprising or corresponding to the two or more virtual positions of the vehicle to estimate for the two or more virtual positions the two or more risks, wherein
in each iteration of the risk estimation process, at a respective virtual position of the plurality of virtual positions a respective risk with regard to the feature is estimated based on the at least one parameter of the vehicle at the current time, and
the risk estimation process is stopped after an iteration, in which the respective risk is equal to or smaller than a risk threshold.

3. The advanced driver assistance system according to claim 1, wherein
in case the processing unit determines two or more features of the environment:
the processing unit is configured to determine, for the current time, the risk zone of at least one feature of the two or more features, and
the display unit is configured to display the environment of the vehicle with the two or more features and the risk zone of the feature of the two or more features; or
the processing unit is configured to determine, for the current time, the risk zone of each feature of the two or more features, and
the display unit is configured to display the environment of the vehicle with the two or more features and the risk zone of at least one feature of the two or more features.

4. The advanced driver assistance system according to claim 1, wherein the feature comprises or corresponds to at least one of
obstacles present in the environment,
street characteristics present in the environment, and
indicators indicating traffic rules.

5. The advanced driver assistance system according to claim 4, wherein
the obstacles comprise further vehicles, persons and further physical objects,
the street characteristics comprise street curves, street intersections, street slopes greater than a slope threshold, street areas influenced by weather and street areas with a damaged surface, and
the indicators indicating traffic rules comprise traffic signs, ground markings on a street and traffic lights.

6. The advanced driver assistance system according to claim 1, wherein the at least one parameter comprises or corresponds to at least one of
a driving direction of the vehicle,
a speed of the vehicle,
an acceleration of the vehicle,
an acceleration time of the vehicle,
a braking time of the vehicle,
a size of the vehicle, and
a shape of the vehicle.

7. The advanced driver assistance system according to claim 1, wherein the respective risk comprises or corresponds to, depending on a type of the feature:
a time-based risk, optionally one of a time headway, a time-to-collision, a time-to-break, a brake thread number, a time-to-steer and responsibility sensitive safety; and/or
a probabilistic risk, optionally a risk estimated according to a Gaussian method or a survival analysis.

8. The advanced driver assistance system according to claim 1, wherein the respective risk comprises or corresponds to, depending on a type of the feature and optionally an estimated driving path of the vehicle at the current time, a risk of:
collision, in case the feature corresponds to an obstacle present in the environment, a street intersection or to an indicator indicating at least one traffic rule, optionally a traffic sign, a ground marking on a street or a traffic light;

lane departure, in case the feature is a street curve, a street intersection, a street slope greater than a slope threshold, a street area influenced by weather or a street area with a damaged surface;

lateral acceleration, in case the feature is a street curve or a street intersection;

acceleration, in case the feature is a street slope greater than the slope threshold;

control loss of the vehicle, in case the feature is a street curve, a street intersection, a street slope greater than the slope threshold, a street area influenced by weather or a street area with a damaged surface;

violation of traffic rules, in case the feature corresponds to an indicator indicating at least one traffic rule, optionally a traffic sign, a ground marking on a street or a traffic light; and/or damage of the vehicle, in case the feature corresponds to a street area with a damaged surface.

9. The advanced driver assistance system according to claim 1, wherein the virtual positions of the vehicle form a grid.

10. The advanced driver assistance system according to claim 1, wherein the processing unit is configured to arrange the virtual positions in the environment:
depending on a type of the feature;
such that the virtual positions are arranged, optionally at least, in an area between the vehicle and the feature at the current time;
such that at least one of the virtual positions is equal to an actual position of the feature or an actual position of a part of the feature at the current time, and/or
such that at least one of the virtual positions is equal to a position associated with the actual position of the feature or associated with the actual position of a part of the feature at the current time.

11. The advanced driver assistance system according to claim 1, wherein the processing unit is configured to arrange the virtual positions in the environment such that the virtual positions are arranged along a path, wherein:
the path is a path between the vehicle and the feature at the current time,
the path is an estimated driving path of the vehicle at the current time,
the path is an estimated movement path of the feature, in case the feature is a movable obstacle,
the path is fitted to a street on which the vehicle and/or the movable obstacle is present, optionally moving, at the current time, and/or
the path is fitted to the feature, and/or
the path is provided by map data.

12. The advanced driver assistance system according to claim 1, wherein
the display unit is configured to display the risk zone of the feature:
by changing a color, shading and/or pattern of the risk zone depending on a distance between a border of the risk zone and an actual position of the vehicle at the current time;
such that the risk zone is segmented in segments of different color, shading and/or pattern, wherein the segments correspond to consecutive ranges of risk; and/or
such that the risk zone is fitted to the feature and/or a street on which the feature is present at the current time.

13. The advanced driver assistance system according to claim 1, wherein in case the feature is a street curve:
the processing unit is configured to estimate, based on the at least one parameter of the vehicle at the current time, at each virtual position of the virtual positions of the vehicle a lateral acceleration caused by a curvature of the street curve as the respective risk, wherein
the virtual positions are equal to actual positions of different parts of the street curve.

14. The advanced driver assistance system according to claim 1, wherein in case the feature is an indicator indicating at least one traffic rule, optionally a traffic sign, a ground marking on a street or a traffic light, or a street intersection:
the processing unit is configured to estimate, based on the at least one parameter of the vehicle at the current time, at each virtual position of the virtual positions of the vehicle a risk of collision as the respective risk; wherein
the virtual positions are arranged at least in an area between the vehicle and the feature and at least one of the virtual positions is equal to an actual position of the feature or an actual position of a part of the feature, or
the virtual positions are arranged at least in an area between the vehicle and the feature and at least one of the virtual positions is equal to a position associated with the actual position of the feature or associated with the actual position of a part of the feature.

15. The advanced driver assistance system according to claim 1, wherein
the processing unit is configured to determine, based on the two or more risks and/or the risk zone of the at least one feature, driving behavior recommendations, driving behavior instructions and/or warnings, and
the display unit is configured to display the driving behavior recommendations, driving behavior instructions and/or warnings.

16. The advanced driver assistance system according to claim 1, wherein the display unit may be configured to display the at least one feature and the risk zone of the at least one feature:
in a 2D birds-eye-view of the environment of the vehicle;
in a first-person-view perspective included in a virtual reality display of the environment of the vehicle;
in a first-person-view perspective using an augmented reality display; and/or
such that they are projected onto a 2D plane of a street, on which the vehicle drives, and such that they are constrained by a street geometry.

17. A vehicle comprising an advanced driver assistance system according to claim 1 for assisting a driver of the vehicle.

18. A method for assisting a driver of a vehicle, wherein the method comprises:
sensing an environment of the vehicle and providing a sensing output;
determining, based on the sensing output, at least one feature of the environment;
determining, for a current time, a risk zone of the feature, by:
estimating, based on at least one parameter of the vehicle at the current time, at each virtual position of two or more virtual positions of the vehicle a respective risk with regard to the feature to estimate for the two or more virtual positions two or more risks, and
forming the risk zone based on the two or more risks; and
displaying the environment of the vehicle with the feature and the risk zone of the feature.

* * * * *